United States Patent
Kobayashi

(10) Patent No.: US 7,346,065 B2
(45) Date of Patent: Mar. 18, 2008

(54) BRIDGE APPARATUS AND BRIDGE METHOD

(75) Inventor: Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 949 days.

(21) Appl. No.: 10/649,899

(22) Filed: Aug. 28, 2003

(65) Prior Publication Data

US 2004/0066789 A1  Apr. 8, 2004

(30) Foreign Application Priority Data

Oct. 1, 2002  (JP) .............................. 2002-288893

(51) Int. Cl.
 *H04L 12/28* (2006.01)
 *H04L 12/56* (2006.01)
(52) U.S. Cl. ...................... 370/401; 370/392; 370/412
(58) Field of Classification Search ........ 370/229–310, 370/328–392, 401–412, 466; 709/223–240
See application file for complete search history.

(56) References Cited

U.S. PATENT DOCUMENTS

| | | | | |
|---|---|---|---|---|
| 5,581,558 | A * | 12/1996 | Horney et al. ............... | 370/401 |
| 6,081,532 | A * | 6/2000 | Fiammante .................. | 370/401 |
| 6,269,252 | B1 * | 7/2001 | Hutchings et al. ........ | 455/552.1 |
| 6,449,251 | B1 | 9/2002 | Awadallah et al. | |
| 6,678,248 | B1 * | 1/2004 | Haddock et al. ............ | 370/235 |
| 6,717,950 | B2 * | 4/2004 | Lui et al. ..................... | 370/408 |
| 6,862,280 | B1 * | 3/2005 | Bertagna ..................... | 370/392 |
| 6,901,452 | B1 * | 5/2005 | Bertagna ..................... | 709/240 |
| 7,092,392 | B2 * | 8/2006 | Yoshino et al. ............. | 370/392 |
| 7,095,748 | B2 * | 8/2006 | Vij et al. ..................... | 370/401 |
| 7,177,310 | B2 * | 2/2007 | Inagaki et al. .............. | 370/392 |
| 7,197,039 | B2 * | 3/2007 | Shizume ..................... | 370/401 |
| 2003/0012164 | A1 * | 1/2003 | Mizoguchi et al. ......... | 370/338 |
| 2003/0063592 | A1 * | 4/2003 | Seki et al. .................. | 370/338 |

FOREIGN PATENT DOCUMENTS

| | | |
|---|---|---|
| JP | 5-22293 | 1/1993 |
| JP | 11-32078 | 2/1999 |
| JP | 11-331249 | 11/1999 |
| JP | 2001-308914 | 11/2001 |
| JP | 2001-358722 | 12/2001 |
| JP | 2002-247042 | 8/2002 |
| WO | WO 01/19040 | 3/2001 |

OTHER PUBLICATIONS

Japanese Office Action dated Sep. 27, 2005 with English translation of pertinent portions.
Japanese Office Action dated Mar. 22, 2006 with English translation of pertinent portions.
European Search Report dated Jun. 19, 2006.

* cited by examiner

*Primary Examiner*—Man U. Phan
(74) *Attorney, Agent, or Firm*—Whitham Curtis Christofferson & Cook, PC

(57) ABSTRACT

Disclosed is a bridge apparatus for the relay of a frame between a wire LAN and a wireless LAN. When a frame transmitted by the wire LAN is a specific frame, a QoS middleware unit of the bridge apparatus adds a bridging request to an FIFO queue having a high priority. And when the frame received from the wire LAN is not a specific frame, the QoS middleware unit adds a bridging request to an FIFO queue having a low priority. A bridging unit performs the priority processing for the bridging request present in the FIFO queue having a high priority, and transmits the frame to the wireless LAN.

27 Claims, 19 Drawing Sheets

BRIDGE APPARATUS AND BRIDGE METHOD

BACKGROUND OF THE INVENTION

1. Field of the Invention

The present invention relates to a bridge apparatus and a bridge method, and relates in particular to a bridge apparatus and a bridge method for providing QoS (Quality of Service) between a device driver and a bridge.

2. Description of the Related Prior Art

A conventional, buffer employing bridge apparatus, for deployment between various network types, is disclosed in JP-A-5-22293, for example. According to the technique described in JP-A-5-22293, when a frame from a network A is transmitted to a reception buffer for a communication port A, a bridge processor reads the header in the frame received from the reception buffer, and performs a bridging process. Then, the bridge processor transmits the frame to the transmission buffer of a communication port B, and the communication port B transmits, to a network B, the frame in the transmission buffer.

When, as described in JP-A-5-22293, a 100 Mbps LAN conforming to IEEE 802.3 is employed for a network A and a wireless LAN conforming to IEEE 802.11 is employed for a network B, the communication capability of the network A is higher by at least one digit than is that of the network B. Therefore, since in JP-A-5-22293 no consideration is given to frame priorities, an inherent problem encountered is in that the transmission, from the network A to the network B, of a frame having a high priority is delayed as long as is the transmission of a frame having a low priority.

SUMMARY OF THE INVENTION

It is, therefore, a first object of the present invention to reduce the throughput time for a frame having a high priority that is relayed by a bridge apparatus.

It is a second object of the present invention to increase the frame relay speed of a bridge apparatus, without the purchase of additional hardware being required.

To achieve these objects, a first bridge apparatus according to the present invention comprises:

a first device driver unit for controlling a first interface unit connected to a first network;

a second device driver unit unit for controlling a second interface unit connected to a second network;

a bridging unit for performing a bridging process; and a middleware unit, inserted between the bridging unit and the first device driver unit, that includes a transmitter for performing priority processing for the relay of a frame from the bridging unit to the first device driver unit.

A second bridge apparatus according to the invention comprises:

a first device driver unit for controlling a first interface unit connected to a first network;

a second device driver unit unit for controlling a second interface unit connected to a second network;

a bridging unit for examining the address of a frame received from the first or the second network to determine whether the address is registered in an address table, and for performing bridging processing for the frame;

a middleware unit, inserted between the bridging unit and the first device driver unit;

a first cache table, in which first session data having a high priority are predesignated;

a second cache table, used when a session is established;

a first FIFO queue;

a second FIFO queue;

a third FIFO queue; and a fourth FIFO queue, wherein the middleware unit includes a first header comparator for, when a transmission request is issued for the relay of a first frame from the bridging unit to the first device driver unit, extracting second session data from headers of a second to a fourth OSI layer in the first frame and, when the second session data are registered in the second cache table, adding the transmission request to the first FIFO queue; for, when the second session data are registered in the first cache table but not in the second cache table and the first frame to be relayed is a specific, predesignated frame, registering the second session data in the second cache table and adding the transmission request to the first FIFO queue; for, when the second session data are registered in the first cache table but not in the second cache table and the first frame is not a specific, predesignated frame, adding the transmission request to the second FIFO buffer; or for, when the second session data are registered neither in the first nor the second cache tables, adding the transmission request to the second FIFO queue, a first synthesization unit for outputting to the first device driver unit, in the named order, the transmission requests in the first FIFO queue and in the second FIFO queue, a second header comparator for, when a bridging request is issued for a second frame to be relayed from the first device driver unit to the bridging unit, extracting third session data from headers of a second to a fourth OSI layer in the second frame and, when the third session data are registered in the second cache table, adding the bridging request to the third FIFO queue; for, when the third session data are registered in the first cache table but not in the second cache table and the second frame to be relayed is a specific, predesignated frame, registering the third session data in the second cache table and adding the bridging request to the third FIFO queue; for, when the third session data are registered in the first cache table but not in the second cache table and the second frame is not a specific, predesignated frame, adding the bridging request to the fourth FIFO queue; or for, when the second session data are registered neither in the first nor in the second cache tables, adding the bridging request to the fourth FIFO queue, and a second synthesization unit for outputting to the bridging unit, in the named order, the bridging requests in the third FIFO queue and in the fourth FIFO queue.

Further, according to the present invention, a first bridge method for a bridge apparatus that relays frames for a second network and a first network comprises the steps of:

receiving from the second network a specific frame to be relayed to the first network;

when session data extracted session data from headers of a second to a fourth OSI layer of the specific frame satisfy a predetermined condition, providing a higher priority for the specific frame in a transmission queue and transmitting the specific frame to the first network.

According to the invention, a second bridge method for a bridge apparatus that relays frames for a second network and a first network comprises the steps of:

receiving from the second network a specific frame to be relayed to the first network;

when session data extracted from headers of a second to a fourth OSI layer in the specific frame satisfy a predetermined condition, providing a higher priority for the specific frame in a bridging queue, performing bridging processing and transmitting the specific frame to the first network;

receiving from the first network a specific frame addressing a transmission destination connected to the second network;

when session data extracted from headers of a second to a fourth OSI layer in the specific frame satisfy a predetermined condition, providing a higher priority for the specific frame in a bridging queue, performing bridging processing, and transmitting the specific frame to the second network.

BRIEF DESCRIPTION OF THE DRAWINGS

A full understanding of the preceding, as well as other objects, features and advantages of the present invention, can be obtained by reading the following detailed description while referring to the accompanying drawings, in which.

DETAILED DESCRIPTION OF THE PREFERRED EMBODIMENTS

Figure 1:
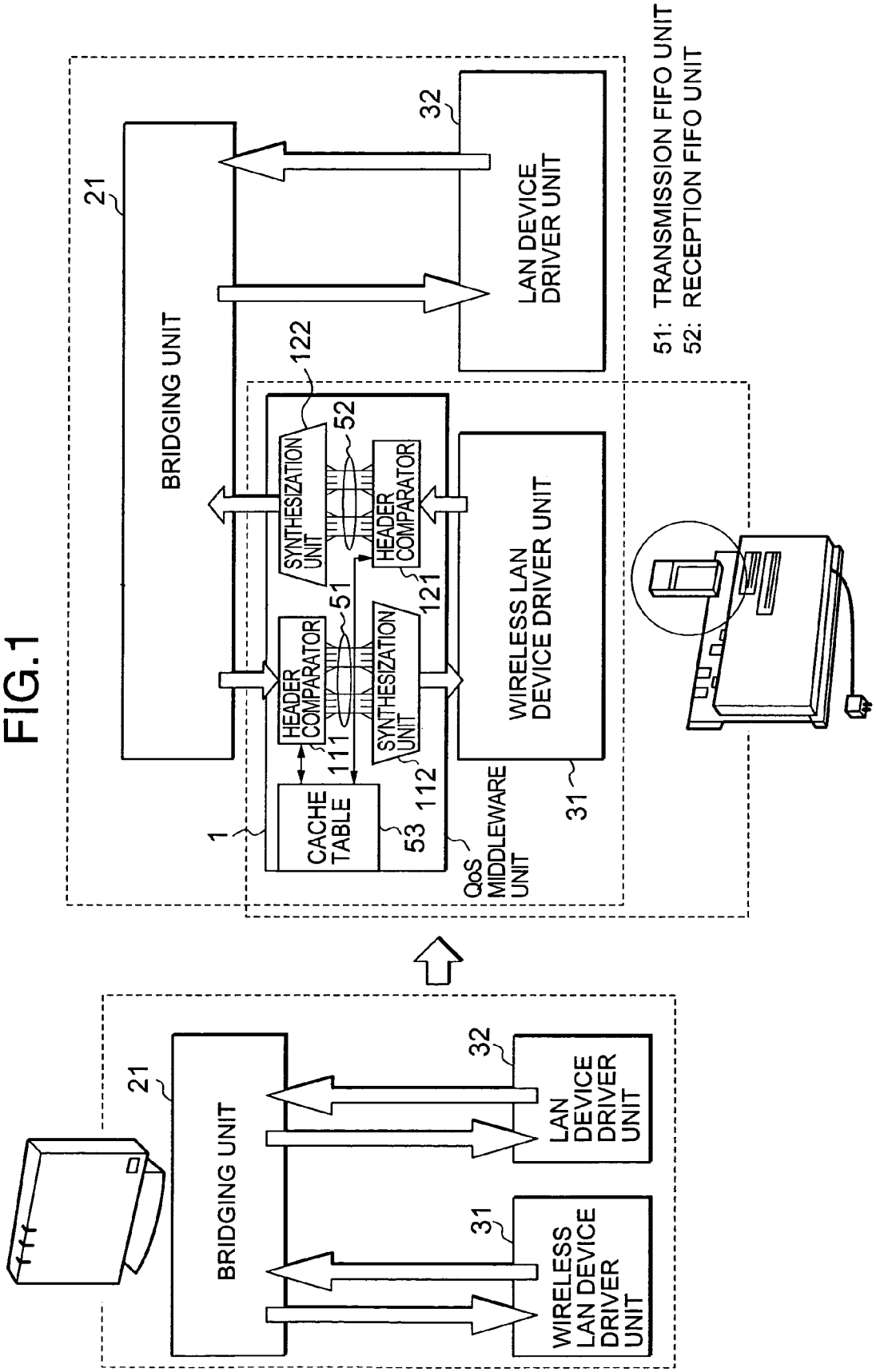
FIG. 1 is a block diagram showing the concept of a basic configuration according to the present invention.

The concept of the basic configuration for the bridge apparatus of the present invention will now be described while referring to FIG. 1.

According to the present invention, the bridge apparatus comprises: a wireless LAN device driver unit 31, for exchanging wireless LAN communication data; a LAN device driver unit 32, for exchanging wire LAN communication data; a bridging unit 21, for establishing a bridge for connecting the wireless LAN device driver unit 31 and the LAN device driver unit 32; and a QoS middleware unit 1, positioned between the bridging unit 21 and the wireless LAN device driver unit 31. The QoS middleware unit 1 includes: a header comparator 111, for relaying to the wireless LAN device driver unit 31 a frame transmission request received from the bridging unit 21; a transmission FIFO unit 51, including a plurality of FIFO queues for which predetermined priorities are provided; and a synthesization unit 112, for synthesizing transmission data obtained from the transmission FIFO unit 51.

The header comparator 111 extracts priorities using pre-registered data in a cache table 53 and session data extracted from header data, queues transmission requests (transmission events) in the transmission FIFO unit 51 in accordance with the priorities and, consonant with a predetermined priority order, selects and relays a specific frame having a high priority. That is, when the header comparator 111 adds a transmission request (transmission event) for a high priority frame to an FIFO queue in the transmission FIFO unit 51, in the queue, the priority for the transmission request to be issued to the wireless LAN device driver unit 31 is increased.

The QoS middleware unit 1 can further include: a header comparator 121 for relaying, to the bridging unit 21, data received from the wireless LAN device driver unit 31; a reception FIFO unit 52 having a plurality of FIFO queues; and a synthesization unit 122.

An explanation will now be given for a first embodiment of the present invention while referring to the accompanying drawings.

A bridge apparatus relays a wireless LAN 901, which conforms to IEEE 802.11 standards, and a wire LAN 902, which conforms to IEEE 802.3 standards.

Figure 2:
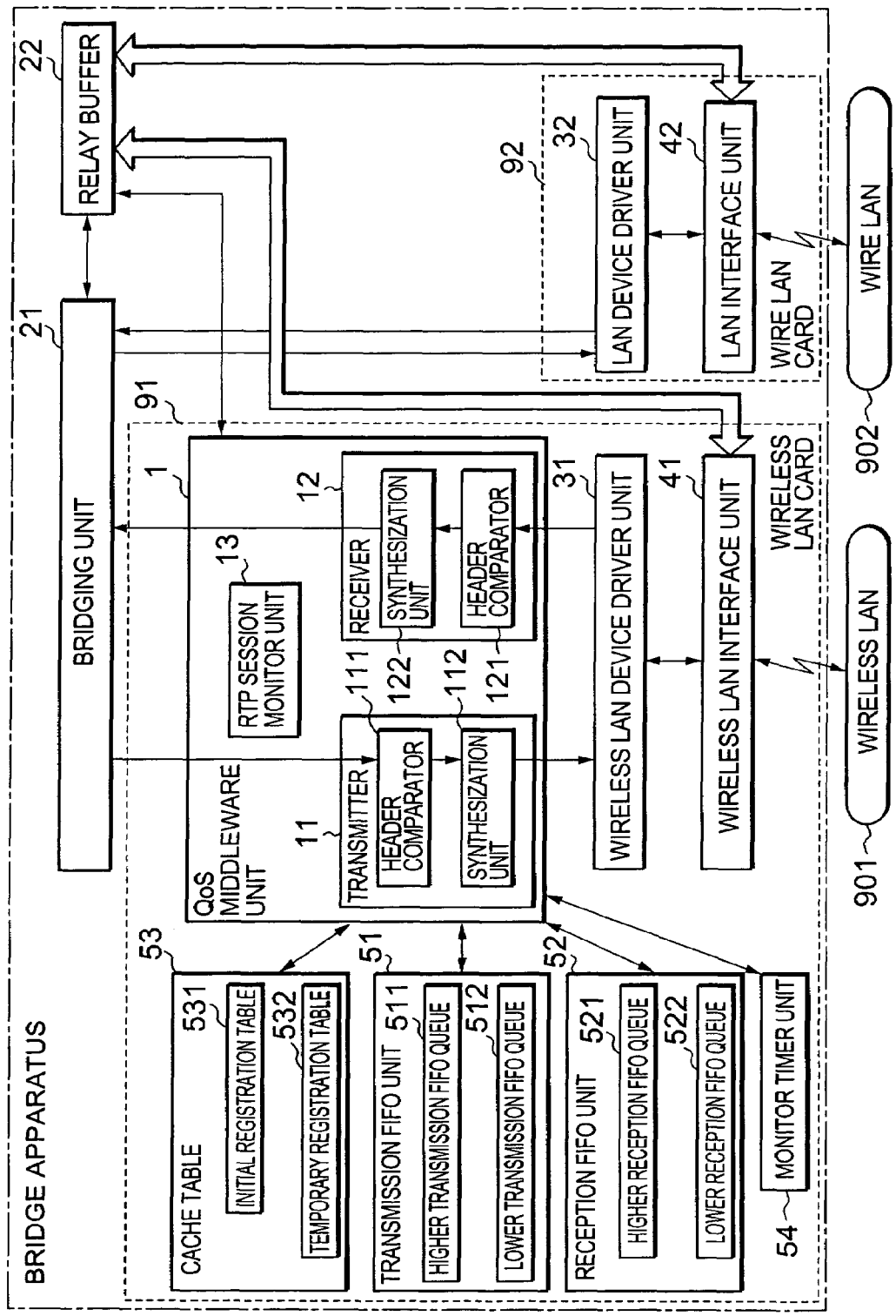
FIG. 2 is a block diagram showing a configuration according to a first embodiment of the present invention.

While referring to FIG. 2, the bridge apparatus comprises: a bridging unit 21, which uses an MAC address for relaying a frame packet; a wireless LAN card 91; a wire LAN card 92; and a relay buffer 22. To operate the bridging unit 21, in this embodiment a program is executed by a processor (not shown) mounted on the side of a main card that provides overall control for the bridge apparatus. While the bridge apparatus in FIG. 2 also includes other functional blocks and hardware units, for the sake of the explanation, these components are not shown.

In FIG. 2, the wireless LAN card 91 includes: a QoS middleware unit 1; a wireless LAN device driver unit 31, for exchanging data consonant with a communication protocol for the data link layer of the wireless LAN 901; a wireless LAN interface unit 41, for exchanging data, consonant with a communication protocol for the physical layer of the wireless LAN 901, under the control of the wireless LAN device driver unit 31; a transmission FIFO unit 51, including a plurality of FIFO queues; a reception FIFO unit 52, including a plurality of FIFO queues; a cache table 53; and a monitor timer unit 54. It should be noted that to operate the QoS middleware unit 1 and the wireless LAN device driver unit 31, in this embodiment a program is executed by a processor (not shown) mounted on the wireless LAN card 91.

The wire LAN card 92 includes: a LAN device driver unit 32, for exchanging data consonant with a communication protocol for the data link layer of the wire LAN 902; and a LAN interface unit 42, for exchanging data consonant with a communication protocol for the physical layer of the wire LAN 902 under the control of the LAN device driver unit 32. It should be noted that to operate the LAN device driver unit 32, in this embodiment a program is executed by a processor (not shown) mounted on the wire LAN card 92.

When the address (the MAC address) of a received frame has not been registered in an address table (not shown), the bridging unit 21 relays the frame to the middleware unit 1 of the wireless LAN card 91, or to the LAN device driver unit 32 of the wire LAN card 92. When the address of the received frame has been registered in the address table, the bridging unit 21 does not relay the frame.

The address table is allocated for a memory (not shown), such as a RAM, and includes a wireless LAN card column and a wire LAN card column. The bridging unit 21 compares the address of a frame received from the wireless LAN card 91 with each MAC address entered in the wireless LAN card column, and compares the address of a frame received from the wire LAN card 92 with each MAC address entered in the wire LAN card column.

The relay buffer 22 is allocated for a memory (not shown) each time a frame is received from the wireless LAN 901 or the wire LAN 902.

The transmission FIFO unit 51 is allocated for a memory (not shown), such as a RAM, and includes an higher transmission FIFO queue 511 having a high priority and a lower transmission FIFO queue 512 having a low priority. The transmission FIFO unit 51 queues, in an FIFO (First In First Out) manner, a frame transmission request (transmission event) issued by the bridging unit 21 to the wireless LAN device driver unit 31.

The reception FIFO unit 52 is allocated for a memory (not shown), such as a RAM, and includes an higher reception FIFO queue 521 having a high priority and a lower reception FIFO queue 522 having a low priority. The reception FIFO unit 52 queues, in an FIFO (First In First Out) manner, a frame bridging request (bridging event) issued by the wireless LAN device driver unit 31 to the bridging unit 21.

The cache table 53 is allocated to a memory (not shown), such as a RAM, and includes: an initial registration table 531, in which session data for an RTP frame (a frame carrying an RTP (Real-time Transport Protocol) packet) are preregistered; and a temporary registration table 532, in which session data are temporarily registered while a session is established. The initial registration table 531 is employed to determine whether a frame has a high priority, and the temporary registration table 532 is employed to omit the processing for analyzing the header data of frames equal to or higher than a fifth OSI layer. When session data pertinent to an RTP frame to be registered to the initial registration table 531 or the temporary registration table 532 are included in the header data of a frame to be relayed, the frame is entered to an higher FIFO queue 511 in the transmission FIFO unit 51 or an higher FIFO queue 521 in the reception FIFO unit 52. When such session data are not included, the frame is entered in a lower FIFO queue 512 in the transmission FIFO unit 51 or a lower FIFO queue 522 in the reception FIFO unit 52. For the frame that is entered in the higher FIFO queue, the priority for the transmission or for the bridging is increased.

One set of session data includes: an MAC address for a location pertinent to the second OSI layer of each header of a frame; a protocol number and an IP address for the location that are pertinent to the third OSI layer; a port number (a TCP or UDP port number in this embodiment) for the location that corresponds to the fourth OSI layer; and the type of an application packet equal to or higher than the fifth OSI layer, and a plurality of these session data sets are preregistered in the initial registration table 531. In this case, the location means either a transmission source or a transmission destination. Further, MAC addresses for a transmission destination and a transmission source pertinent to the second OSI layer, a protocol number and IP addresses for the transmission destination and the transmission source that are pertinent to the third OSI layer, and port numbers for the transmission destination and the transmission source pertinent to the fourth OSI layer form one set of session data, and each time a new session is established, the session data are registered for each header of a frame to the temporary registration table 532, and when a session is not established, the session data are deleted.

The QoS middleware unit 1 comprises: a transmitter 11, for performing the priority processing for a transmission request during the transmission of a frame to the wireless LAN 901; a receiver 12, for performing the priority processing for a bridging request for the reception of a frame from the wireless LAN 901; and an RTP session monitor unit 13.

The transmitter 11 includes: a header comparator 111, for comparing session data in the cache table 53 with session data that are extracted from the header data in a frame to be relayed, and for storing a transmission request (transmission event) to the transmission FIFO unit 51 that includes an FIFO queue having a corresponding priority; and a synthesization unit 112, for synthesizing data (transmission event) output by the transmission FIFO unit 51, i.e., identifying the FIFO queue in the transmission FIFO unit 51, and for outputting the resultant data to the wireless LAN device driver unit 31.

The receiver 12 includes: a header comparator 121, for comparing the session data in the cache table 53 with session data that are extracted from the header data in a frame to be relayed, and for storing a bridging request (bridging event) to the reception FIFO unit 52 that includes an FIFO queue having a predetermined priority; and a synthesization unit 122, for synthesizing the data (bridging event) output by the reception FIFO unit 52, i.e., identifying the FIFO queue in the reception FIFO unit 52, and for outputting the resultant data to the bridging unit 21.

Figure 3:
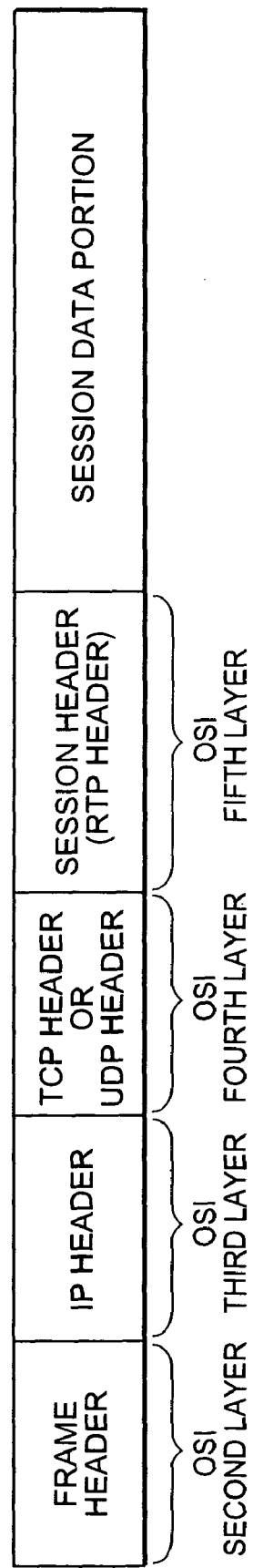
FIG. 3 is a diagram for explaining the allocation of headers in a frame.

While referring to FIG. 3, a frame is formed of a frame header conforming to 802.3 standards, a TCP header (or a UDP header), a session header (header of an RTP packet) and a session data portion.

The monitor timer unit 54 includes a plurality of timers, and is used to monitor the session data registered in the temporary registration table 532 of the cache table 53. Each timer of the monitor timer unit 54 is activated (cleared and started) by the RTP session monitor unit 13, and generates a timer interrupt when a predetermined time is reached.

The RTP session monitor unit 13 starts the timers of the monitor timer unit 54 to monitor the session data in the temporary registration table 532 of the cache table 53. When the count of any timer of the monitor timer unit 54 reaches a predetermined time (time out), the session data that have been monitored are deleted from the temporary registration table 532.

The operation of the first embodiment of the present invention will now be described while referring to FIGS. 2 to 7.

First, when the LAN interface unit 42 receives, from the wire LAN 902, a frame to be relayed to the wireless LAN 901, the LAN device driver unit 32 permits the LAN interface unit 42 to store the received frame in a location in the relay buffer 22, and then issues, to the bridging unit 21, a bridging request for the received frame. The bridging unit 21 compares the address (MAC address of the transmission destination included in the frame header) of the received frame that is stored in the relay buffer 22 with each MAC address pre-registered in the address table. When the address of the received frame is not registered in the address table, the bridging unit 21 issues a transmission request to the QoS middleware unit 1 to relay the frame to the wireless LAN 901. In this case, the transmission request includes data for a storage location in the relay buffer 22 and length data.

When the address of the received frame is found in the address data, the bridging unit 21 need not relay the frame, and ignores this frame by releasing the pertinent buffer in the relay buffer 22.

When the QoS middleware unit 1 receives the transmission request from the bridging unit 21 and shifts the control to the transmitter 11, the header comparator 111 of the transmitter 11 extracts, from the header data of the frame, the port numbers of the transmission destination and the transmission source, the IP addresses of the transmission destination and the transmission source, the protocol number, and the MAC addresses of the transmission destination and the transmission source, and designates them as the session data. The header comparator 111 determines whether session data having the same contents as the extracted session data are present in the temporary registration table 532 of the cache table 53 (steps S101 and S102 in FIG. 4).

Figure 4:
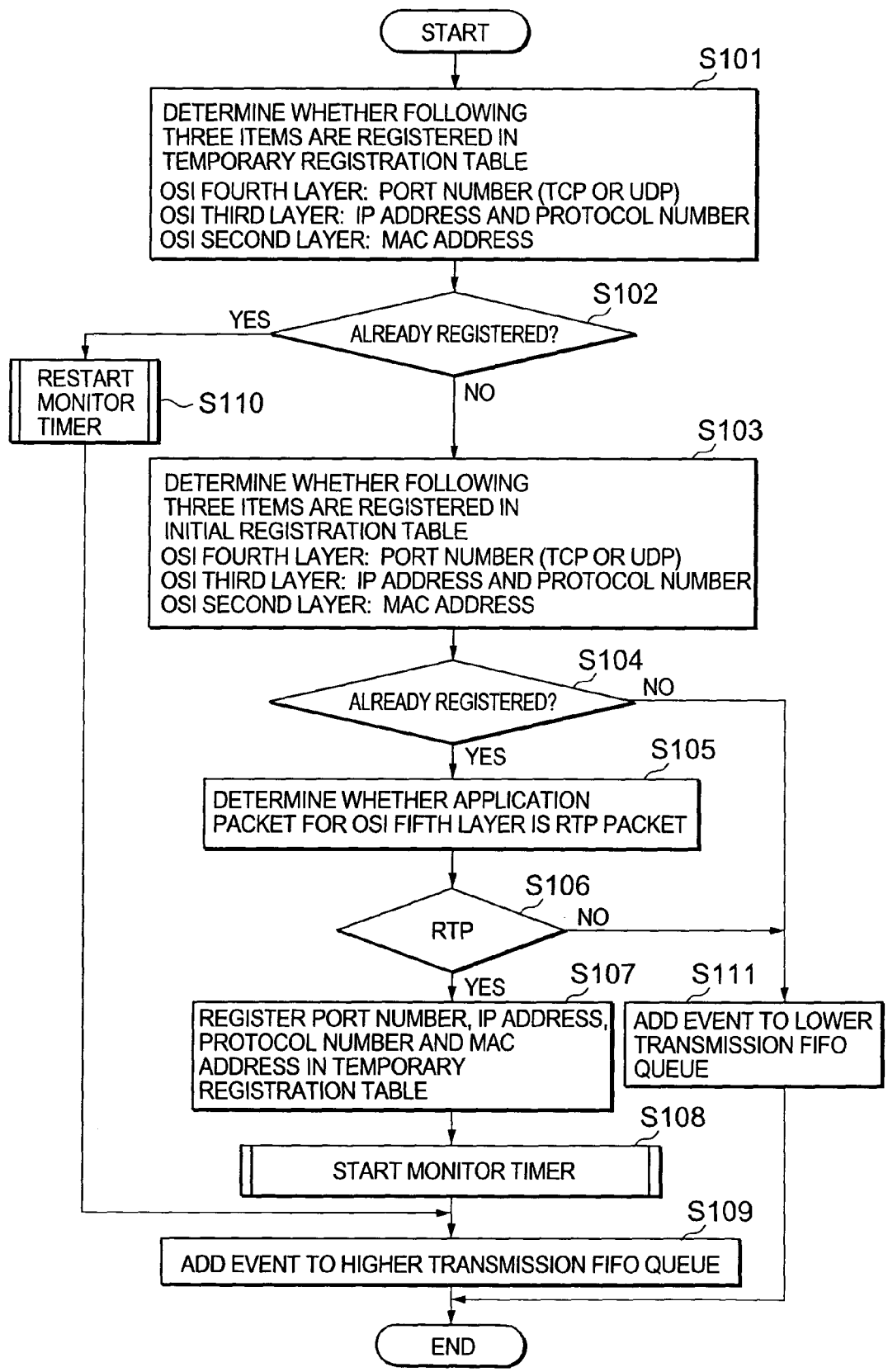
FIG. 4 is a flowchart for the operation of the header comparator that is included in the wireless-LAN-side transmitter of a QoS middleware unit in FIG. 1 or 9.

When the session data having the same contents are not found in the temporary registration table 532 of the cache table 53 (NO at step S102), the header comparator 111 determines whether session data having the same contents as the extracted session data are present in the initial registration table 531 of the cache table 53 (steps S103 and S104 in FIG. 4).

When the session data having the same contents are found in the initial registration table 531 (YES at step S104), the header comparator 111 examines the RTP header at the fifth OSI layer of the frame to be relayed to determine whether this frame is an RTP frame (steps S105 and S106).

When the frame to be relayed is an RTP frame (YES at step S106), the header comparator 111 enters, to the temporary registration table 532, the session data extracted from the header data in the frame, and permits the RTP session monitor unit 13 to activate (reset and start) the timers of the monitor timer unit 54 (steps S107 and S108).

When the timers are started, the header comparator 111 of the transmitter 11 adds a transmission request as a transmission event to the higher transmission FIFO queue 511 (step S109). It should be noted that the transmission event includes identification data for the transmission request, the storage location in the relay buffer 22 and the length data of a frame to be relayed.

When the frame to be relayed is not an RTP frame (NO at step S106), the header comparator 111 enters the transmission request as a transmission event to the lower transmission FIFO queue 512 (step S111).

When the session data having the same contents are present in the temporary registration table 532 (YES at step S102), the header comparator 111 permits the RTP session monitor unit 13 to reactivate (reset and restart) the timers of the monitor timer unit 54, and adds the transmission request to the higher transmission FIFO queue 511 (steps S110 and S109).

When the session data having the same data are not present in the initial registration table 531 (NO at step S104), the header comparator 111 adds the transmission request as a transmission event to the lower transmission FIFO queue 512 (step S111).

Figure 5:
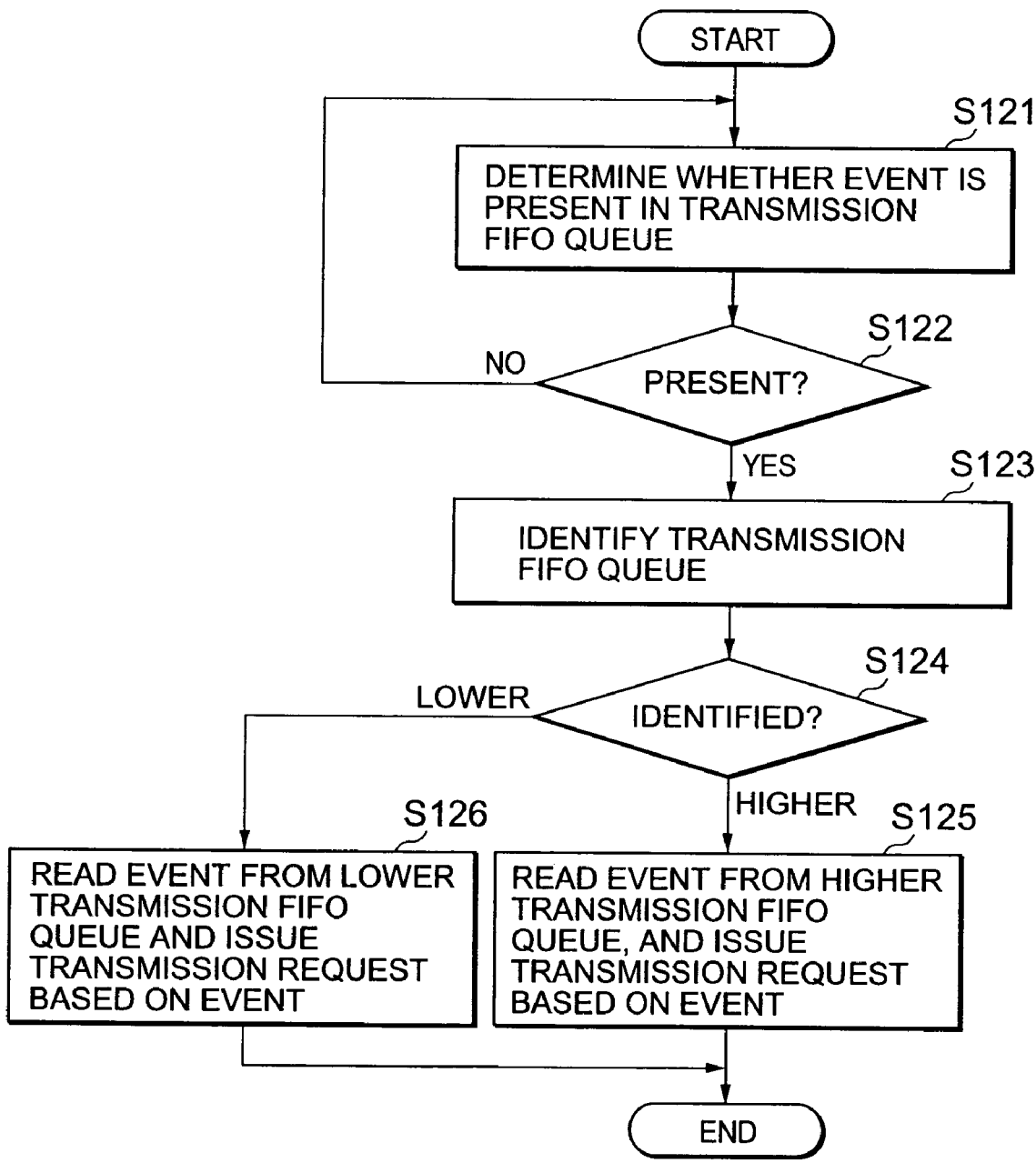
FIG. 5 is a flowchart for the operation of the synthesization unit that is included in the wireless-LAN-side transmitter of the QoS middleware unit in FIG. 1 or 9.
Figure 6:
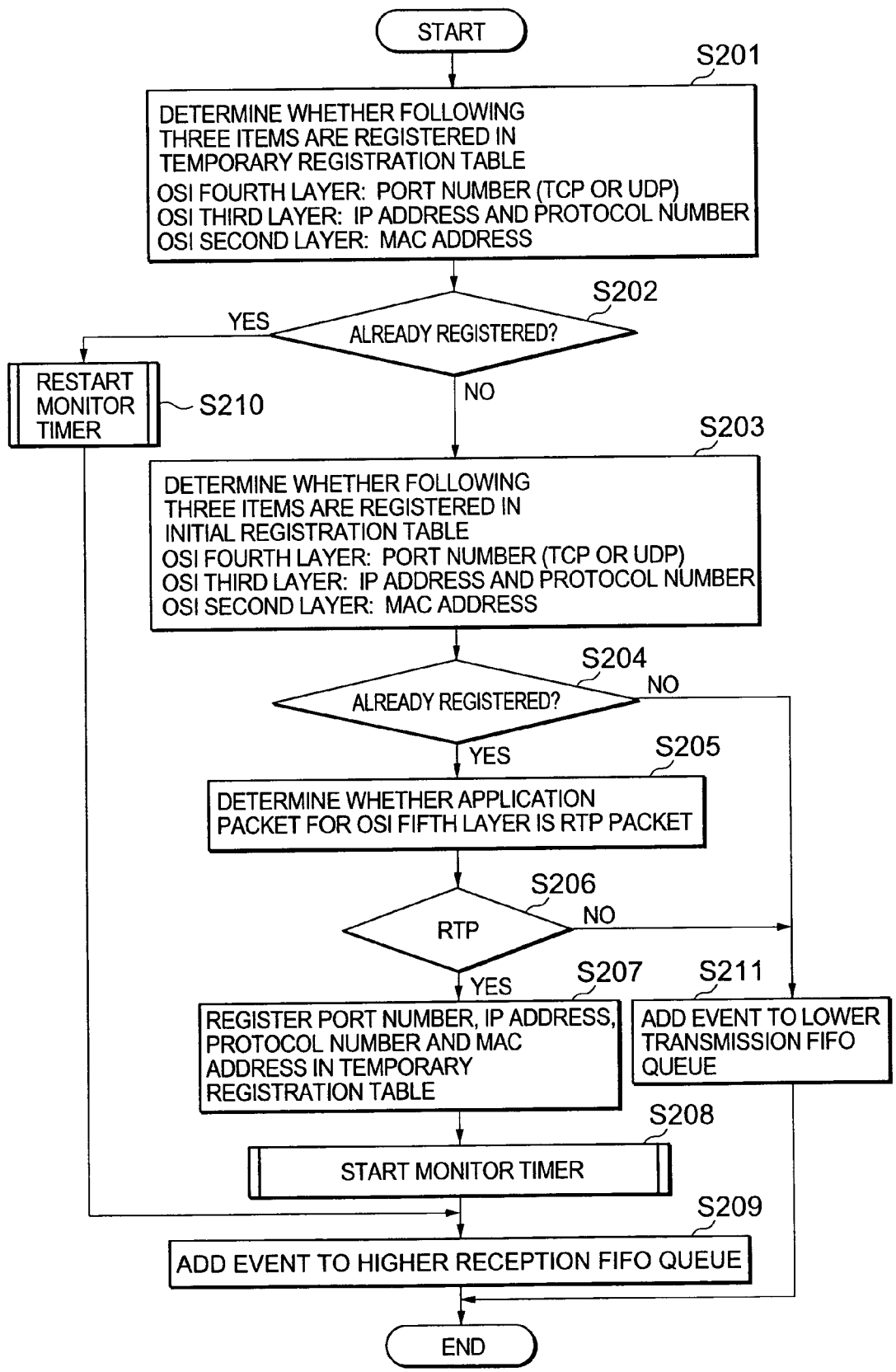
FIG. 6 is a flowchart for the operation of the header comparator that is included in the wireless-LAN-side receiver of the QoS middleware unit in FIG. 1 or 9.

When the wireless LAN device driver unit 31 does not currently engage the transmission (it is not in use), the synthesization unit 112 examines the transmission FIFO unit 51 to determine whether the transmission event is present (step S121 in FIG. 5). When the transmission event is present in the transmission FIFO unit 51 (YES at step S122), the synthesization unit 112 identifies the transmission FIFO queue (steps S123 and S124). In this embodiment, the unused state of the wireless LAN device driver unit 31 is determined by determining whether a transmission is currently being performed; however, the data remaining to be transmitted may be examined to determine whether the operation of the synthesization unit 112 is required. That is, when the synthesization unit 112 is to be operated, depending on the amount of data remaining to be transmitted, during the transmission waiting time, transmission requests in the transmission queue can be rearranged in accordance with their priorities.

When the transmission event is present in the higher transmission FIFO queue 511 (higher at step S124), based on the transmission event, which is read from the higher transmission FIFO queue 511, the synthesization unit 112 issues a transmission request to the wireless LAN device driver unit 31 (S125). When the transmission event is not in the higher transmission FIFO queue 511 (lower at step S124), based on the transmission event read from the lower transmission FIFO queue 512, the synthesization unit 112 issues a transmission request to the wireless LAN device driver unit 31 (step S126).

Based on the transmission request received from the synthesization unit 112, the wireless LAN device driver unit 31 permits the wireless LAN interface unit 41 to transmit a frame from the pertinent location in the relay buffer 22 to the wireless LAN 901.

Next, when the wireless LAN interface unit 41 receives from the wireless LAN 901 a frame to be relayed to the wire LAN 902, the wireless LAN device driver unit 31 permits the wireless LAN interface unit 41 to store the received frame in the relay buffer 22, and thereafter, issues to the QoS middleware unit 1 a bridging request for the received frame.

Upon receiving the bridging request from the wireless LAN device driver unit 31, the QoS middleware unit 1 shifts control to the receiver 12. Then, the header comparator 121 of the receiver 12 extracts, from the header data sets in the frame, the port numbers of the transmission destination and the transmission source, the IP addresses of the transmission destination and the transmission source, the protocol number and the MAC addresses of the transmission destination and the transmission source, and designates these data as session data. The header comparator 121 then determines whether session data having the same contents as the extracted session data are present in the temporary registration table 532 of the cache table 53 (steps S201 and S202 in FIG. 6).

When session data having the same contents are not present in the temporary registration table 532 (NO at step S202), the header comparator 121 determines whether session data having the same contents as the extracted session data are present in the initial registration table 531 of the cache table 53 (steps S203 and S204).

When session data having the same contents are found in the initial registration table 531 (YES at step S204), the header comparator 121 examines the RTP header for the fifth OSI layer of the frame to be relayed to determine whether the frame is an RTP frame (steps S205 and S206).

When the frame to be relayed is an RTP frame (YES at step S206), the header comparator 121 registers, in the temporary registration table 532, the session data that are extracted from the header data in the frame, and permits the RTP session monitor unit 13 to activate (reset and start) the timers of the monitor timer unit 54 (steps S207 and S208).

Further, the header comparator 121 adds the bridging request, as a bridging event, to the higher reception FIFO queue 521 (step S209). It should be noted that a bridging request includes identification data for the bridging request, the storage location in the relay buffer 22 and the length data for a frame to be relayed.

When the frame to be relayed is not an RTP frame (NO at step S206), the header comparator 121 adds the bridging request, as a bridging event, to the lower reception FIFO queue 522 (step S211).

When session data having the same contents are present in the temporary registration table 532 (YES at step S202), the header comparator 121 permits the RTP session monitor unit 13 to reactivate (reset and restart) the timers of the monitor timer unit 54, and adds the bridging request, as a bridging event, to the higher reception FIFO queue 521 (steps S210 and S209).

When session data having the same contents are not found in the initial registration table 531 (NO at step S204), the header comparator 121 adds the bridging request, as a bridging event, to the lower reception FIFO queue 522 (step S211).

Figure 7:
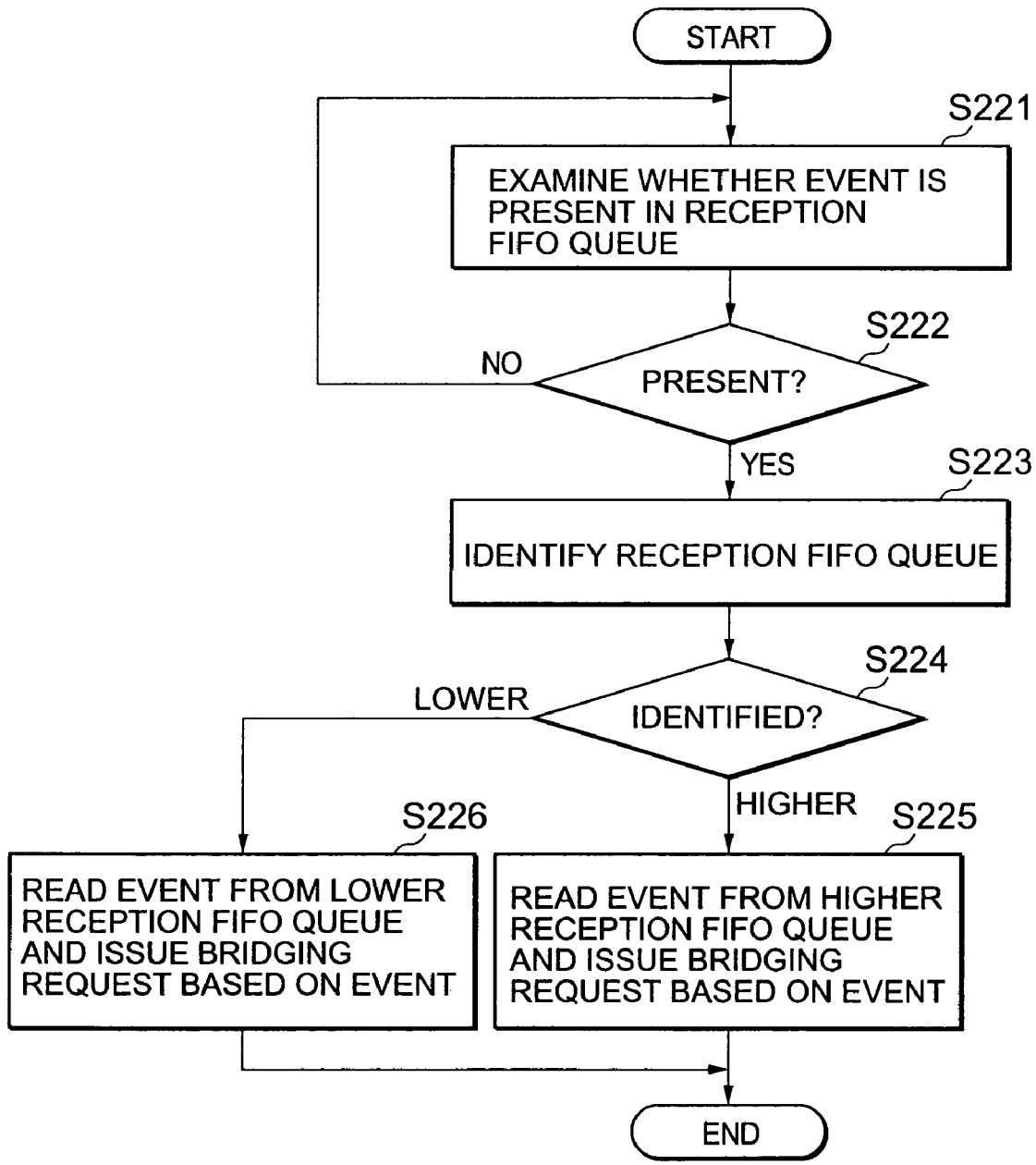
FIG. 7 is a flowchart for the operation of the synthesization unit that is included in the wireless-LAN-side receiver of the QoS middleware unit in FIG. 1 or 9.

When the bridging unit 21 is not currently engaged in the bridging processing (is not in use), the synthesization unit 122 determines whether the bridging event is stored in the reception FIFO unit 52 (step S221 in FIG. 7). When the bridging event is present in the reception FIFO unit 52 (YES at step S222), the synthesization unit 122 identifies the reception FIFO queue (steps S223 and S224).

When the bridging event is in the higher reception FIFO queue 521 (higher at step S224), based on the bridging event that is read from the higher reception FIFO queue 521, the synthesization unit 122 issues a bridging request to the bridging unit 21 (step S225). When the bridging event is not in the higher reception FIFO queue 521 (lower at step S224), based on the bridging event that is read from the lower reception FIFO queue 522, the synthesization unit 122 issues a bridging request to the bridging unit 21 (step S226).

Upon receiving the bridging request from the synthesization unit 122, because the frame must be relayed, when the MAC address of the transmission destination, which is the address of the received frame, is not registered in the address table, the bridging unit 21 issues a transmission request to the LAN device driver unit 32. And when the MAC address of the transmission destination has already been registered in the address table, the bridging unit 21 need not relay the received frame, and can ignore the frame by releasing the pertinent buffer in the relay buffer 22.

The LAN device driver unit 32, which has received the transmission request from the bridging unit 21, permits the LAN interface unit 42 to transmit the frame from the pertinent location in the relay buffer 22 to the wire LAN 902.

In the above explanation, for each session, the RTP session monitor unit 13 has allocated one timer of the monitor timer unit 54; however, a single time may be employed for monitoring the periods for the individual sessions. In this case, for example, the timer generates and repeatedly issues interrupts to the RTP session monitor unit 13 at a constant time interval, such as 1 ms. Each time session data are registered in the temporary registration table 532 of the cache table 53, at step S108 (or at step S208 for reception), the RTP session monitor unit 13 obtains an area (a count area) for measuring the time. When a timer interrupt occurs, the registered count area is incremented by one, and at step S110 (or S210 for reception), the count area is cleared. When through the use of the timer interrupt a predetermined value is obtained for the count area, the RTP session monitor unit 13 deletes the pertinent session data.

Further, in the above explanation, the session data have been registered in the initial registration table 531 and in the temporary registration table 532 of the cache table 53; however, the data to be registered are not limited to the session data.

Therefore, for the above described bridge apparatus, when a wire LAN 902 of 100 M that conforms to IEEE 802.3 standards is employed, the communication capability of the wireless LAN 901 that conforms to IEEE 802.3 standards is lower by at least one digit than is that of the wire LAN 902. However, since the QoS middleware unit 1 that uses the FIFO queues to perform the priority processing is arranged between the bridging unit 21, which performs the bridging process, and the wireless LAN device driver unit 31, the repeated occurrence is reduced of a phenomenon whereby the transmission, to the wireless LAN 901, of communication data having a high priority is delayed.

In addition, when each FIFO queue in the transmission FIFO unit 51 and the reception FIFO unit 52 is allocated for a standard memory, such as a RAM, mounted in the bridge apparatus, and when the program of the QoS middleware unit 1 is installed, the QoS can be provided while the current environment is employed unchanged, and it is not necessary, while taking transmission waiting into account, to purchase new, QoS compatible hardware. As a result, the required expenses can be reduced.

A second embodiment of the present invention will now be described while referring to the drawings.

Figure 8:
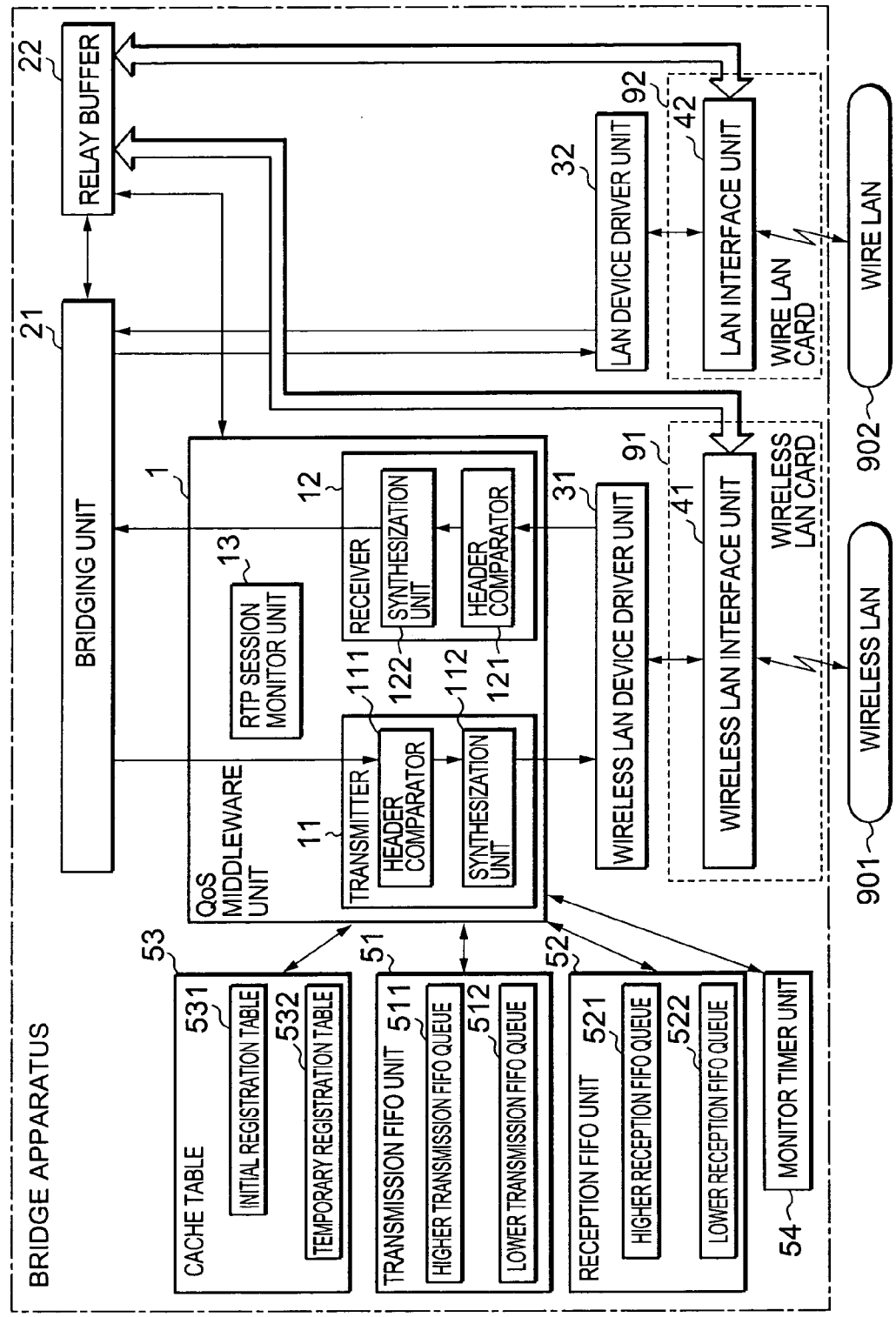
FIG. 8 is a block diagram showing a configuration according to a second embodiment of the present invention.

Referring to FIG. 8, a bridge apparatus according to the second embodiment of the invention comprises: a bridging unit 21, a QoS middleware unit 1, a wireless LAN device driver unit 31, a LAN device driver unit 32, a transmission FIFO unit 51, a reception FIFO unit 52, a cache table 53, a monitor timer unit 54, a wireless LAN card 91 that includes a wireless LAN interface unit 41, a wire LAN card 92 that includes a LAN interface unit 42, and a relay buffer 22. To operate the bridging unit 21, in this embodiment the QoS middleware unit 1, the wireless LAN device driver unit 31 and the LAN device driver unit 32 a program is executed by a processor (not shown) mounted on the side of a main card. While the bridge apparatus in FIG. 8 also includes other functional blocks and hardware components, for the sake of the explanation, these components are not shown.

The bridge apparatus in this embodiment differs from that for the first embodiment in FIG. 1 in that the wireless LAN card 91 does not include the QoS middleware unit 1, the wireless LAN device driver unit 31, the transmission FIFO unit 51, the reception FIFO unit 52, the cache table 53 and the monitor timer unit 54, and in that the wire LAN card 92 does not include the LAN device driver unit 32. That is, the second embodiment differs from the first embodiment in that the QoS middleware unit 1, the wireless LAN device driver unit 31 and the LAN device driver unit 32 are included in the functional blocks operated, through the execution of a program, by the processor provided on the main card side.

Since the operation of the bridge apparatus in FIG. 8 for the second embodiment is performed in the same manner as in the first embodiment, as was explained while referring to FIGS. 3 to 7, no further explanation for the operation will be given.

In this embodiment, when the wireless LAN device driver unit 31 is operated by the processor mounted on the main card, the same effects can be acquired as are obtained by the first embodiment.

A third embodiment for the present invention will now be described while referring to the drawings.

Figure 9:
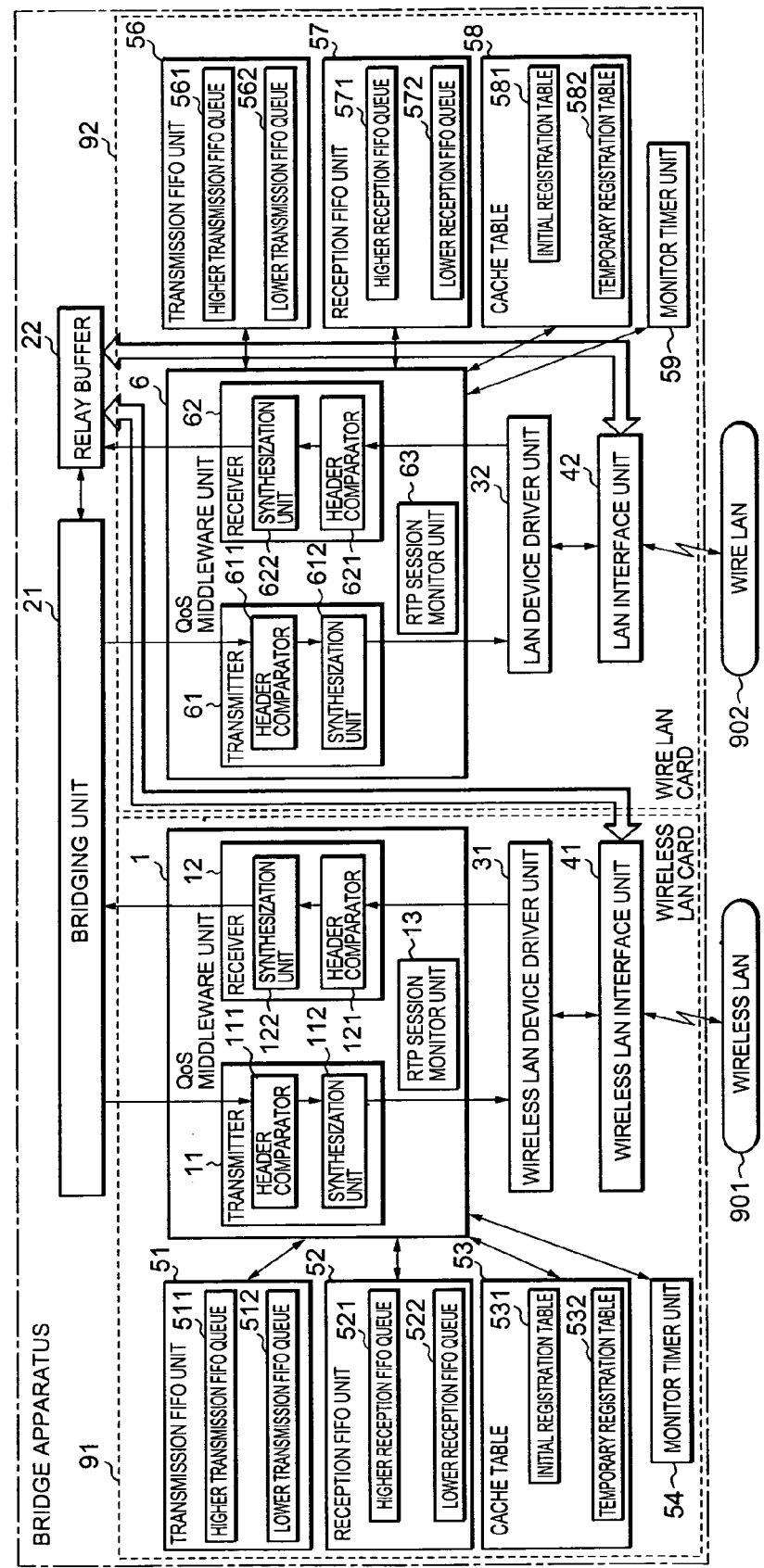
FIG. 9 is a block diagram showing a configuration according to a third embodiment of the present invention.
Figure 10:
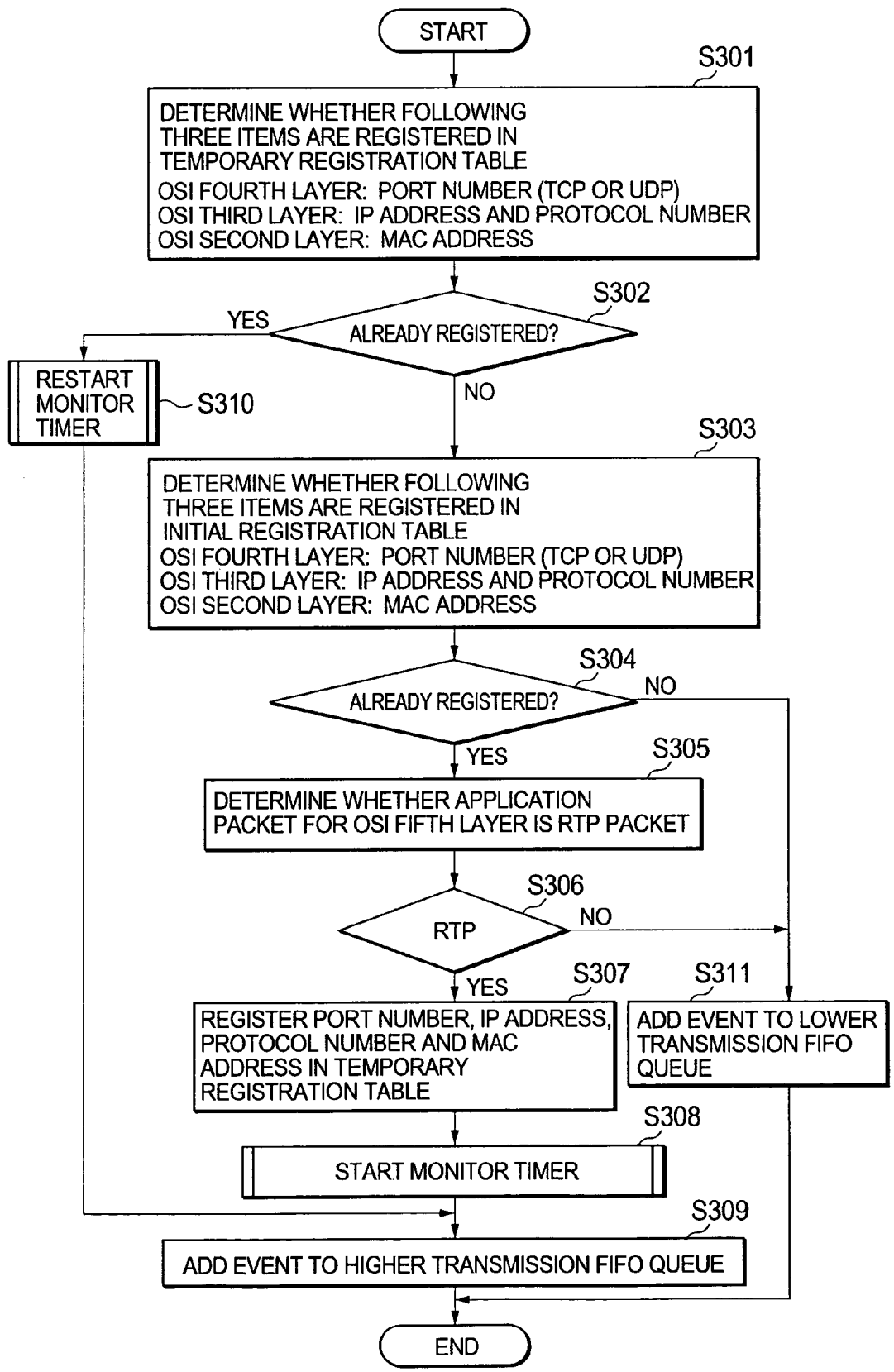
FIG. 10 is a flowchart for the operation of the header comparator that is included in the wire-LAN-side transmitter of the QoS middleware unit in FIG. 9.

While referring to FIG. 9, a bridge apparatus for the third embodiment comprises: a bridging unit 21, a wireless LAN card 91, a wire LAN card 92 and a relay buffer 22.

The third embodiment differs from the first embodiment in the configuration of the wire LAN card 92. More specifically, the third embodiment differs from the first embodiment in that a QoS middleware unit 6 is additionally provided for the wire LAN card 92 to perform the priority processing for an event relayed between the bridging unit 21 and a LAN device driver unit 32, and in that the wire LAN card 92 includes a transmission FIFO unit 56, a reception FIFO unit 57, a cache table 58 and a monitor timer unit 59. It should be noted that the QoS middleware unit 6 and the LAN device driver unit 32 are functional blocks that are operated through the execution of a program by a processor provided on the wire LAN card 92.

The bridging unit 21 compares the address of the packet for a frame received via a network with each MAC address registered in an address table (not shown). When the same MAC address is not present in the address table, the bridging unit 21 relays the frame to the pertinent wireless LAN card 91 or the pertinent wire LAN card 92. When the same MAC address is found in the address table, the bridging unit 21 does not relay the frame.

The transmission FIFO unit 56 is allocated for a memory (not shown), such as a RAM, and includes an higher transmission FIFO queue 561 having a high priority and a lower transmission FIFO queue 562 having a low priority. A transmission request (transmission event) transmitted by the bridging unit 21 to the LAN device driver unit 32 is added to a queue in the FIFO (First In First Out) manner.

The reception FIFO unit 57 is allocated for a memory (not shown), such as a RAM, and includes an higher reception FIFO queue 571 having a high priority and a lower reception FIFO queue 572 having a low priority. A bridging request (bridging event) transmitted by the LAN device driver unit 32 to the bridging unit 21 is added to a queue in the FIFO (First In First Out) manner.

The cache table 58 is allocated for a memory (not shown), such as a RAM, and is constituted by an initial registration table 581, in which session data for an RTP frame are preregistered, and a temporary registration table 582, in which session data are temporarily registered while a session is being established. The initial registration table 581 is used to identify a frame and determine whether it is one having a high priority, and the temporary registration table 582 is used to eliminate the processing for analyzing the header data for a packet equal to or higher than a fifth OSI layer. When the session data for an RTP packet, which are to be registered in the temporary registration table 582 or in the initial registration table 581, are included in the header data for a frame to be relayed, this frame is added to the higher FIFO queue 561 in the transmission FIFO unit 56 the higher FIFO queue 561 or the higher FIFO queue 571 in the reception FIFO unit 57. When the session data are not included, the frame is added to the lower FIFO queue 562 of the transmission FIFO unit 56 or the lower FIFO queue 572 of the reception FIFO unit 57.

Multiple sets of session data are preregistered in the initial registration table 581, and included in each set are: an MAC address for a location pertinent to the second OSI layer of each header in a frame; a protocol number and an IP address for the location, which are pertinent to the third OSI layer; a port number for the location (a TCP or UDP port number in this embodiment) that is pertinent to the fourth OSI layer; and the type of an application packet equal to or higher than the fifth OSI layer. The location in this case represents either a transmission source or a transmission destination. Further, each time a new session is established, one set of session data is registered in the temporary registration table 582, and when the session is not established, the session data are deleted. The session data includes, for each header for a frame, MAC addresses for a transmission destination and a transmission source pertinent to the second OSI layer, a protocol number and IP addresses for the transmission destination and the transmission source that are pertinent to the third OSI layer, and port numbers (TCP or UDP port numbers in this case) for the transmission destination and the transmission source pertinent to the fourth OSI layer.

The QoS middleware unit 6 comprises: a transmitter 61, for performing the priority processing for a transmission request during the transmission of a frame to the wire LAN 902; a receiver 62, for performing the priority processing during the reception of a frame from the wire LAN 902; and an RTP session monitor unit 63.

The transmitter 61 includes: a header comparator 611, for comparing the session data in the cache table 58 with the session data extracted from the header data in a frame to be relayed, and for storing a transmission request (transmission event) in the transmission FIFO unit 56 in which FIFO queues have priorities; and a synthesization unit 612, for synthesizing the output data (transmission event) for the transmission FIFO unit 56, i.e., identifying the transmission FIFO queue in the transmission FIFO unit 56, and for outputting the resultant data to the LAN device driver unit 32.

The receiver 62 includes: a header comparator 621, for comparing the session data in the cache table 58 with the session data extracted from the header data for a frame to be relayed, and for storing a bridging request (a bridging event) in the reception FIFO unit 57 in which FIFO queues have predetermined priorities; and a synthesization unit 622, for synthesizing the output data (a bridging event) of the reception FIFO unit 57, i.e., identifying the reception FIFO queue of the reception FIFO unit 57, and for outputting the resultant data to the bridging unit 21.

The monitor timer unit 59, which includes a plurality of timers, is used to monitor the session data entered in the temporary registration table 582 of the cache table 58. Each timer in the monitor timer unit 59 is activated (cleared and started) by the RTP session monitor unit 63, and generates a timer interrupt when a predetermined time is reached.

The RTP session monitor unit 63 activates the timers in the monitor timer unit 59 to monitor the session data entered in the temporary registration table 582 of the cache table 58. When each timer in the monitor timer unit 59 has counted a predetermined time (a time out), the session data that have been monitored are deleted from the temporary registration table 582.

Since the other configuration shown in FIG. 9 is the same as that for the first embodiment, no further explanation will be given for it.

The operation of the third embodiment of the present invention will now be described while referring to FIGS. 3 to 7 and FIGS. 9 to 13.

The transmitter 11, for the wireless LAN 901, and the transmitter 61, for the wire LAN 902, use different interfaces, for their relative device drivers, to perform the same operation.

First, when the LAN interface unit 42 has received, from the wire LAN 902, a frame to be relayed to the wireless LAN 901, the LAN device driver unit 32 permits the LAN interface unit 42 to store the received frame in the location in the relay buffer 22, and thereafter, issues to the QoS middleware unit 6 a bridging request for the received frame.

Upon receiving the bridging request from the LAN device driver unit 32, the QoS middleware unit 6 shifts the execution control to the receiver 62. The header comparator 621 of the receiver 62 extracts, from the header data for the frame, the port numbers for a transmission destination and a transmission source, the IP addresses of the transmission destination and the transmission source, the protocol number and the MAC addresses of the transmission destination and the transmission source, and designates these data as session data. Then, the header comparator 621 determines whether session data having the same contents as the extracted session data are present in the temporary registration table 582 of the cache table 58 (steps S401 and S402 in FIG. 12).

When session data having the same contents are not found in the temporary registration table 582 (NO at step S402), the header comparator 621 determines whether session data having the same contents as the extracted session data are present in the initial registration table 581 of the cache table 58 (steps S403 and S404).

When session data having the same contents are found in the initial registration table 581 (YES at step S404), the header comparator 621 examines the RTP header at the fifth OSI layer of the frame to be relayed to determine whether this frame is an RTP frame (steps S405 and S406).

When the frame to be relayed is an RTP frame (YES at step S406), the header comparator 621 registers, in the temporary registration table 582, the session data that are extracted from the header data in the frame, and permits the RTP session monitor unit 63 to activate the timers of the monitor timer unit 59 (steps S407 and S408).

Following this, the header comparator 621 adds a bridging request, as a bridging event, to the higher reception FIFO queue 571 (step S409). It should be noted that the bridging event includes identification data for a transmission request, the storage location in the relay buffer 22 and the length data for a frame to be relayed.

When the frame to be relayed is not an RTP frame (NO at step S406), the header comparator 621 adds a bridging request, as a bridging event, to the lower reception FIFO queue 572 (step S411).

When session data having the same contents are found in the temporary registration table 582 (YES at step S402), the header comparator 621 permits the RTP session monitor unit 63 to reactivate the timers in the monitor timer unit 59, and adds a bridging request, as a bridging event, to the higher reception FIFO queue 571 (steps S410 and S409).

When session data having the same contents are not found in the initial registration table 581 (NO at step S404), the header comparator 621 adds a bridging request, as a bridging event, to the lower reception FIFO queue 572 (step S411).

Figure 13:
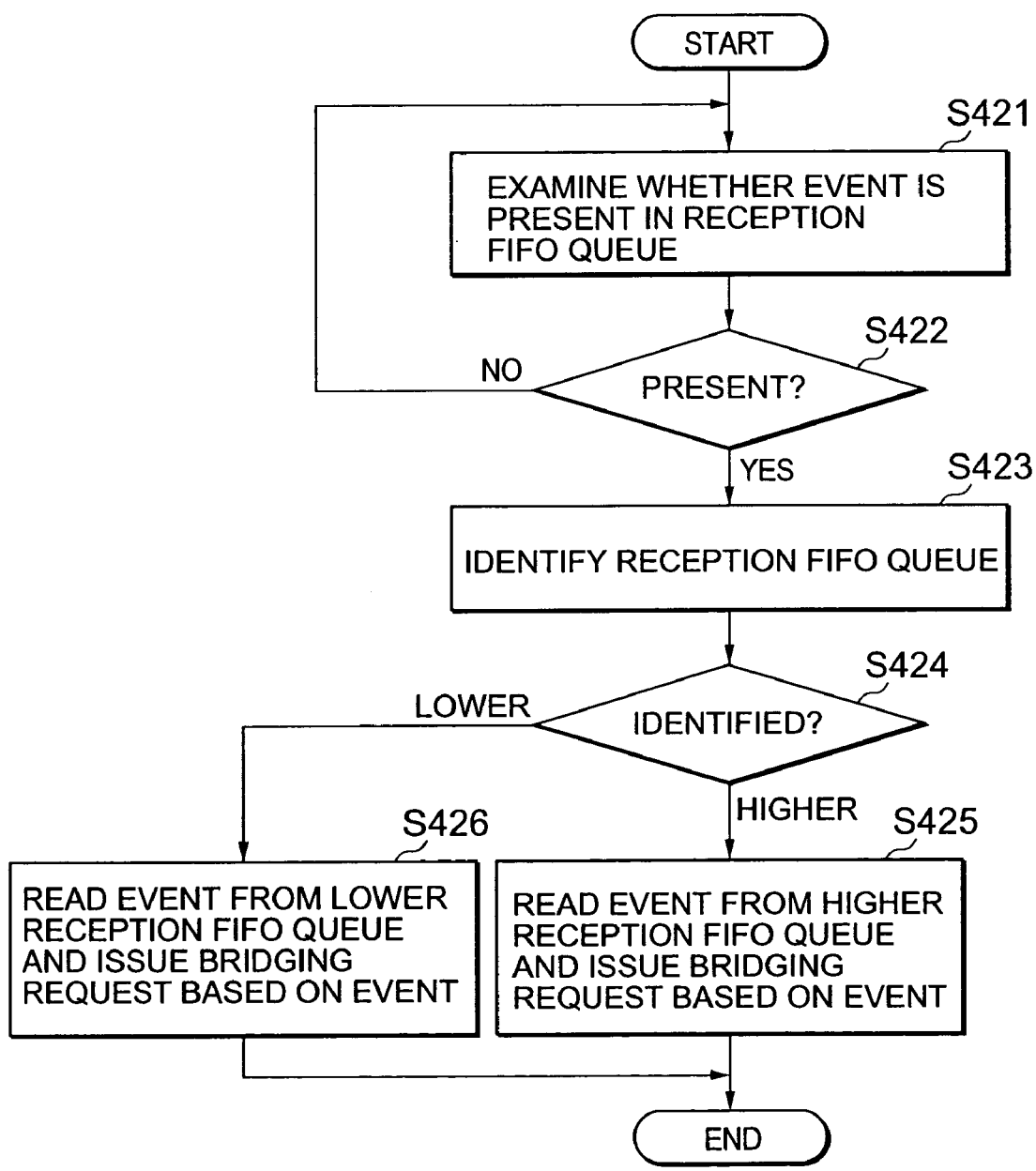
FIG. 13 is a flowchart for the operation of the synthesization unit that is included in the wire-LAN-side receiver of the QoS middleware unit in FIG. 9.

When the bridging unit 21 is not currently engaged in the bridging processing (is not in use), the synthesization unit 622 determines whether the bridging event is present in the reception FIFO unit 57 (step S421 in FIG. 13). When the bridging event is in the reception FIFO unit 57 (YES at step S422), the synthesization unit 622 identifies a reception FIFO queue (steps S423 and S424).

When the bridging event is present in the higher reception FIFO queue 571 (higher at step S424), the synthesization unit 622 transmits a bridging request to the bridging unit 21 based on the bridging event read from the higher reception FIFO queue 571 (step S425). When the bridging event is not present in the higher reception FIFO queue 571 (lower at step S424), based on the bridging event read from the lower reception FIFO queue 572, the synthesization unit 622 transmits a bridging request to the bridging unit 21 (step S426).

When the bridging unit 21 receives the bridging request from the synthesization unit 622 and the MAC address of the transmission destination, which is the address of the frame received and stored in the relay buffer 22, has not yet been registered in the address table, because the frame must be relayed, the bridging unit 21 issues a transmission request to the QoS middleware unit 6. In this case, the transmission request includes the data for the storage location in the relay buffer 22 and the length data for the frame.

When the MAC address of the transmission destination has already been registered in the address table, the bridging unit 21 need not relay the frame, and ignores it by releasing the pertinent buffer in the relay buffer 22.

On the other hand, in the third embodiment of the invention, the wireless LAN card 91 performs the operation in the same manner (FIGS. 4 to 7) as it is for the wireless LAN card 91 in the first embodiment, and issues a bridging request to the bridging unit 21.

When the bridging unit 21 receives the bridging request from the synthesization unit 122 and the MAC address of the transmission destination, which is the address of the packet for the received frame, is not registered in the address table, because the frame must be relayed, the bridging unit 21 issues a transmission request to the QoS middleware unit 6. Whereas, when the MAC address of the transmission destination has already been registered in the address table, the bridging unit 21 need not relay the received frame, and ignores it by releasing the pertinent buffer in the relay buffer 22.

Upon receiving the transmission request from the bridging unit 21, the QoS middleware unit 6 shifts the execution control to the transmitter 61. Then, the header comparator 611 of the transmitter 61 extracts, from the header data in the frame, the port numbers for the transmission destination and the transmission source, the IP addresses for the transmission destination and the transmission source, the protocol number and the MAC addresses for the transmission destination and the transmission source, and designates these data as session data. Thereafter, the header comparator 611 determines whether session data having the same contents as the extracted session data are present in the temporary registration table 582 of the cache table 58 (steps S301 and S302 in FIG. 10).

When session data having the same contents as the extracted session data are not found in the temporary registration table 582 (NO at step S302), the header comparator 611 determines whether session data having the same contents are present in the initial registration table 581 of the cache table 58 (steps S303 and S304).

When session data having the same contents are found in the initial registration table 581 (YES at step S304), the header comparator 611 examines the RTP header on the OSI fifth layer of the frame to be relayed to determine whether this frame is an RTP frame (steps S305 and S306).

When the frame to be relayed is an RTP frame (YES at step S306), the header comparator 611 registers, in the temporary registration table 582, the session data that are extracted from the header data of the frame, and permits the RTP session monitor unit 63 to activate the timers in the monitor timer unit 59 (steps S307 and S308).

Following this, the header comparator 611 adds a transmission request, as a transmission event, to the higher transmission FIFO queue 561 (step S309). In this case, the transmission request includes the identification data for a transmission event, the storage location in the relay buffer 22 and the length data for a frame to be relayed.

When the frame to be relayed is not an RTP frame (NO at step S306), the header comparator 611 adds a transmission request, as a transmission event, to the lower transmission FIFO queue 562 (step S311).

When session data having the same contents as the extracted session data are found in the temporary registration table 582 (YES at step S302), the header comparator 611 permits the RTP session monitor unit 63 to reactivate the timers in the monitor timer unit 59, and adds a transmission request to the higher transmission FIFO queue 561 (steps S310 and S309).

When session data having the same contents are not found in the initial registration table 581 (NO at step S304), the header comparator 611 adds a transmission request, as a transmission event, to the lower transmission FIFO queue 562 (step S311).

Figure 11:
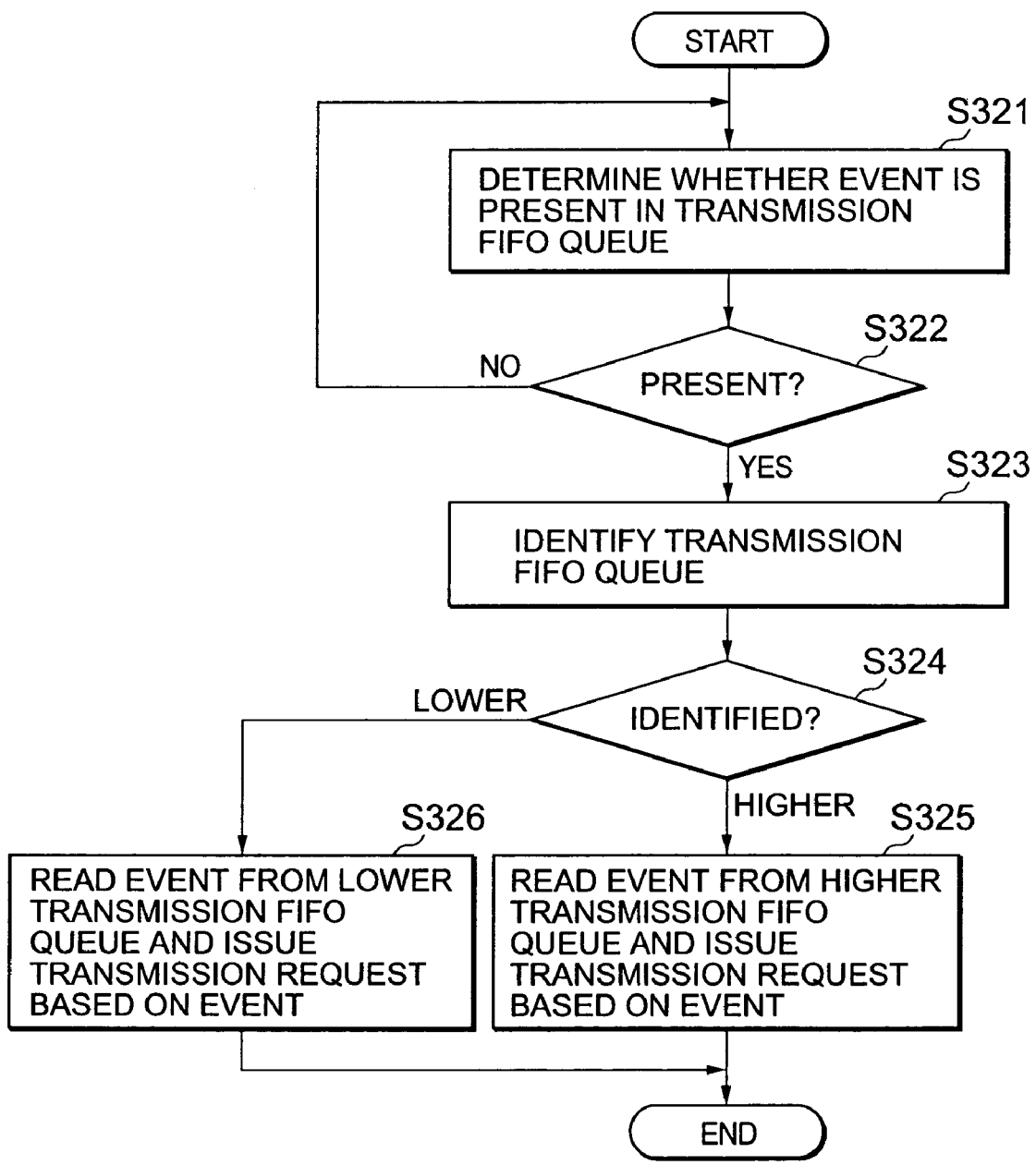
FIG. 11 is a flowchart for the operation of the synthesization unit that is included in the wire-LAN-side transmitter of the QoS middleware unit in FIG. 9.
Figure 12:
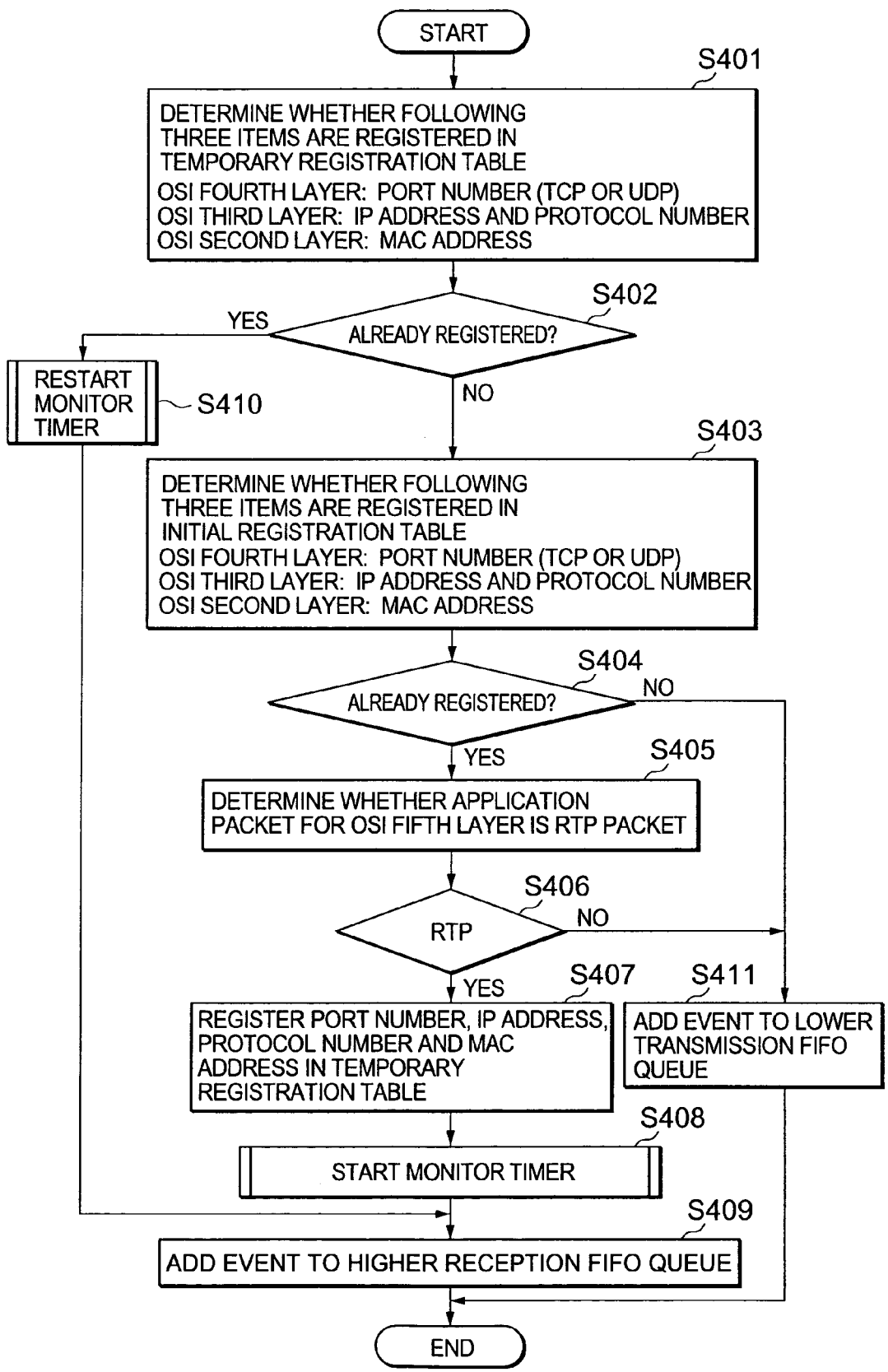
FIG. 12 is a flowchart for the operation of the header comparator that is included in the wire-LAN-side receiver of the QoS middleware unit in FIG. 9.

When the LAN device driver unit 32 is not currently performing a transmission (not in use), the synthesization unit 612 determines whether the transmission event is stored in the transmission FIFO unit 56 (step S321 in FIG. 11). When the transmission event is present in the transmission FIFO unit 56 (YES at step S322), the synthesization unit 612 identifies a transmission FIFO queue (steps S323 and S324). In this embodiment, depending on whether a transmission is currently being performed, the state of the LAN device driver unit 32 is examined; however, the amount of data remaining to be transmitted may be examined to determine whether the synthesization unit 612 of the transmitter 61 should be operated. That is, when the operation of the synthesization unit 612 is started after the amount of data remaining to be transmitted has been examined, during the transmission waiting time, the transmission requests in the transmission queue can be rearranged in accordance with the applicable priorities.

When the transmission event is in the higher transmission FIFO queue 561 (the higher at step S324), based on the transmission event read from the higher transmission FIFO queue 561, the synthesization unit 612 unconditionally issues a transmission request to the LAN device driver unit 32 (step S325). Whereas, when the transmission event is not present in the higher transmission FIFO queue 561, based on the transmission event read from the lower transmission FIFO queue 562 (step S326), the synthesization unit 612 issues a transmission request to the LAN device driver unit 32.

Based on the transmission request received from the synthesization unit 612, the LAN device driver unit 32 permits the LAN interface unit 42 to relay the frame from the pertinent location in the relay buffer 22 to the wire LAN 902.

A fourth embodiment of the present invention will now be described while referring to the drawings.

Figure 14:
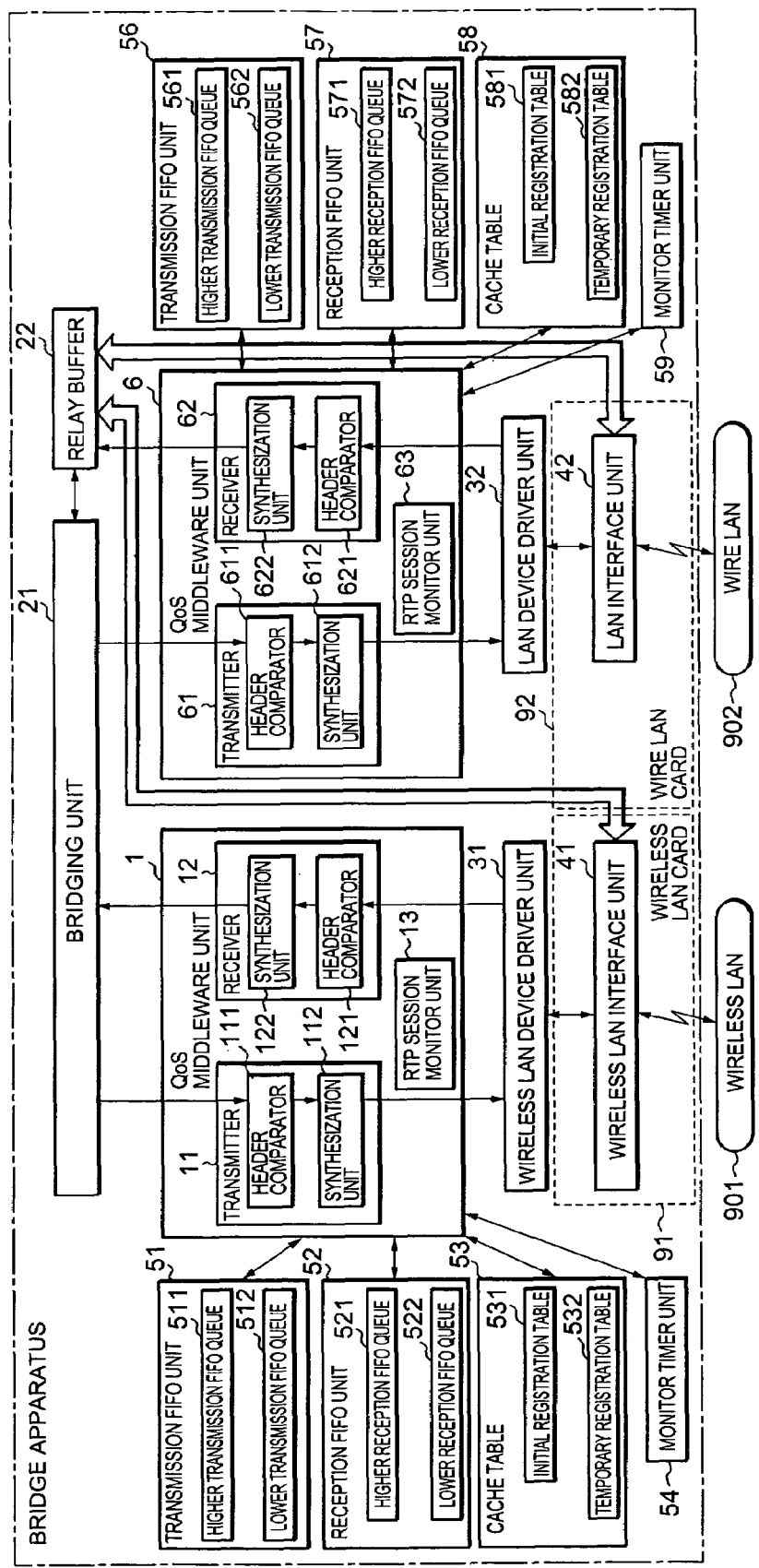
FIG. 14 is a block diagram showing a configuration according to a fourth embodiment of the present invention.

While referring to FIG. 14, a bridge apparatus according to the fourth embodiment comprises: a bridging unit 21, QoS middleware units 1 and 6, a wireless LAN device driver unit 31, a LAN device driver unit 32, a transmission FIFO unit 51, a reception FIFO unit 52, a cache table 53, a monitor timer unit 54, a transmission FIFO unit 56, a reception FIFO unit 57, a cache table 58, a monitor timer unit 59, a wireless LAN card 91 having a wireless LAN interface unit 41, a wire LAN card 92 having a LAN interface unit 42, and a relay buffer 22. The bridging unit 21, the QoS middleware units 1 and 6, the wireless LAN device driver unit 31 and the LAN device driver unit 32 are operated in accordance with a program executed by a processor (not shown) that in this embodiment is mounted on the side of the main card. The bridge apparatus in FIG. 14 also includes other functional blocks and hardware units (not shown).

The bridge apparatus in the fourth embodiment differs from the bridge apparatus in the third embodiment (FIG. 9) in that the wireless LAN card 91 does not include the QoS middleware unit 1, the wireless LAN device driver unit 31, the transmission FIFO unit 51, the reception FIFO unit 52, the cache table 53 and the monitor timer unit 54, and in that the wireless LAN card 91 does not include the QoS middleware unit 6, the LAN device driver unit 32, the transmission FIFO unit 56, the reception FIFO unit 57, the cache table 58 and the monitor timer unit 59. That is, the fourth embodiment differs from the third embodiment in that the QoS middleware units 1 and 6, the wireless LAN device driver unit 31 and the LAN device driver unit 32 are functional blocks operated through the execution of a program by the processor that is provided on the side of the main card. The QoS middleware unit 1 and the QoS middleware unit 6 may be integrally formed to provide a single QoS middleware unit.

Since the operation shown in FIGS. 3 and 10 to 13 of the bridge apparatus in FIG. 14 for the fourth embodiment is the same as that for the third embodiment, no explanation for it will be given.

A fifth embodiment of the present invention will now be described while referring to the drawings.

Figure 15:
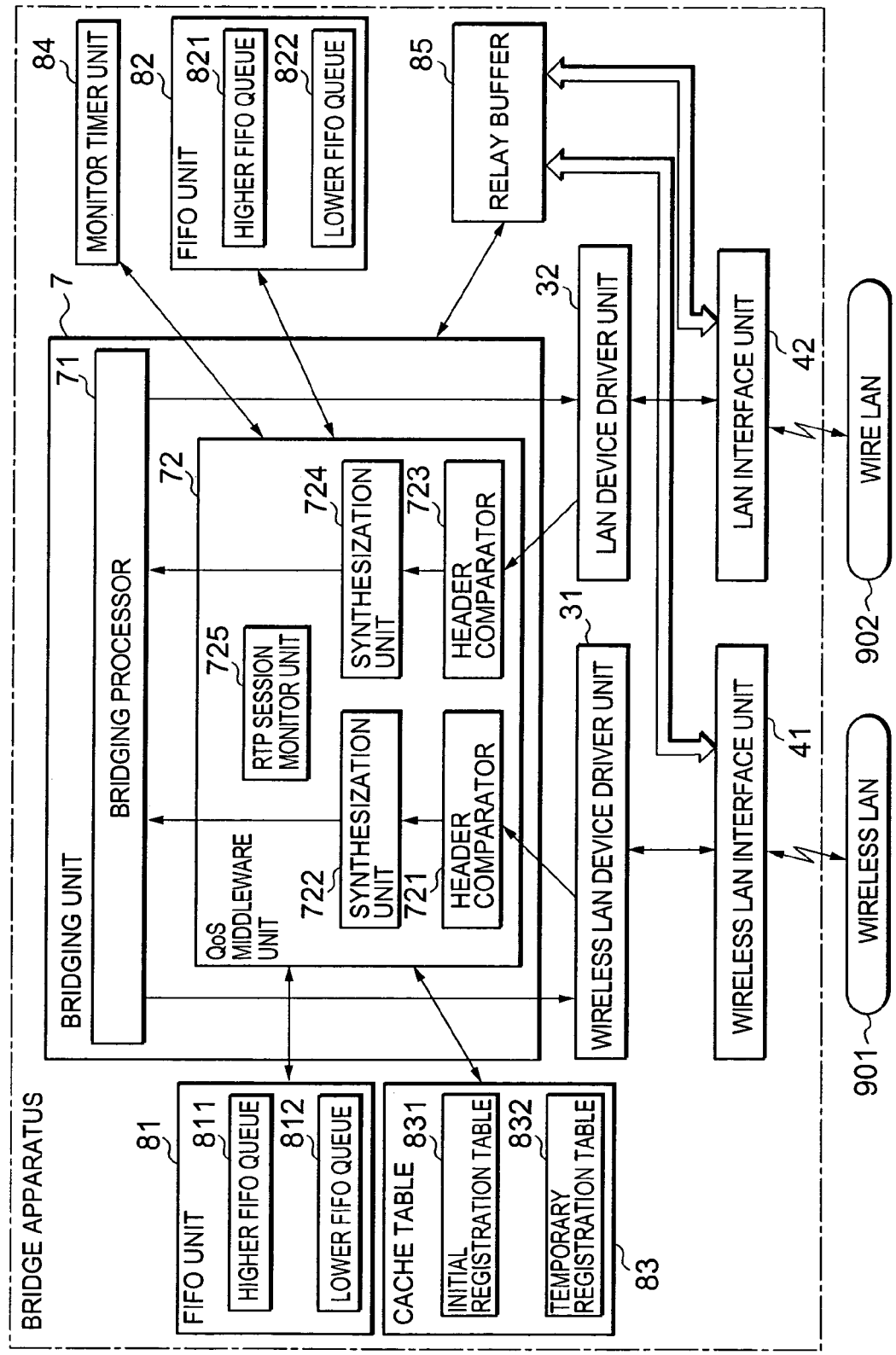
FIG. 15 is a block diagram showing a configuration according to a fifth embodiment of the present invention.
Figure 16:
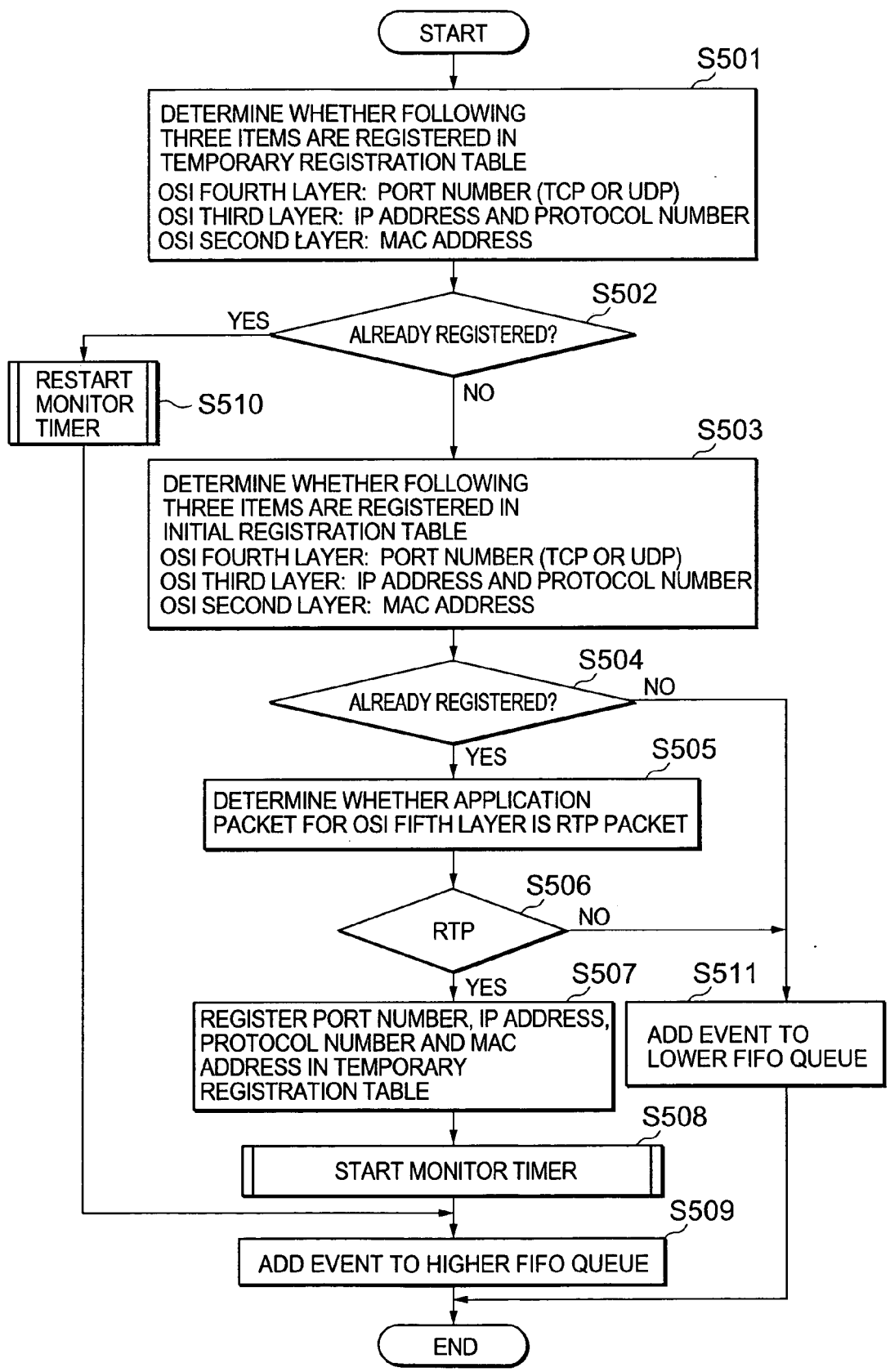
FIG. 16 is a flowchart showing the operation of the header comparator of a QoS middleware unit in FIG. 15.

While referring to FIG. 15, a bridge apparatus according to the fifth embodiment comprises: a bridging unit 7; a wireless LAN device driver unit 31, for exchanging data using a communication protocol for the data link layer of a wireless LAN 901; a wireless LAN interface unit 41, for exchanging data using a communication protocol for the physical layer of the wireless LAN 901 controlled by the wireless LAN device driver unit 31; an FIFO unit 81 having a plurality of FIFO queues; an FIFO unit 82 having a plurality of FIFO queues; a cache table 83; a monitor timer unit 84; a relay buffer 85; a LAN device driver unit 32, for exchanging data using a communication protocol for the data link layer of a wire LAN 902; and a LAN interface unit 42, for exchanging data using a communication protocol for the physical layer of the wire LAN 902 controlled by the LAN device driver unit 32.

The bridging unit 7, the wireless LAN device driver unit 31 and the LAN device driver unit 32 are functional blocks operated through the execution of a program by a processor (not shown). While the bridge apparatus in FIG. 15 comprises other functional blocks and hardware units, for the sake of the explanation, these components are not shown.

The bridging unit 7 includes: a bridging processor 71 for relaying a frame; and a QoS middleware unit 72, for performing the priority processing for a bridging request transmitted by the wireless LAN device driver unit 31 or the LAN device driver unit 32 to the bridging processor 71.

When the address (MAC address) of a received frame has not yet been registered in an address table (not shown), the bridging processor 71 relays the frame to the wireless LAN device driver unit 31 or to the LAN device driver unit 32. When the address of a received frame has been registered in the address table, the bridging processor 71 does not relay the frame.

The address table is allocated to a memory (not shown), such as a RAM, and includes a wireless LAN column and a wire LAN column. The bridging processor 71 compares the address of a frame received from the wireless LAN 901 with each MAC address entered in the wireless LAN column, or compares the address of a frame received from the wire LAN 902 with each MAC address entered in the wire LAN column.

The relay buffer 85 is allocated for a memory (not shown) each time a frame is received from the wireless LAN 901 or the wire LAN 902.

The FIFO unit 81 is allocated to a memory (not shown), such as a RAM, and includes an higher FIFO queue 811 having a high priority and a lower FIFO queue 812 having a low priority. When a header comparator 721 receives a bridging request (a bridging event) from the wireless LAN device driver unit 31, the header comparator 721 adds this request to the FIFO unit 81 in an FIFO (First In First Out) manner.

The FIFO unit 82 is allocated to a memory (not shown), such as a RAM, and includes an higher FIFO queue 821 having a high priority and a lower FIFO queue 822 having a low priority. When a header comparator 723 receives a bridging request (a bridging event) from the LAN device driver unit 32, the header comparator 723 adds this request to the FIFO unit 82 in an FIFO (First In First Out) manner.

The cache table 83 is allocated for a memory (not shown), such as a RAM, and includes: a temporary registration table 832, in which session data for an RTP frame (a frame carrying an RTP packet) are preregistered; and an initial registration table 831, in which session data are temporarily registered while a session is being established. The initial registration table 831 is employed to identify a frame having a high priority, and the temporary registration table 832 is employed to eliminate the processing for analyzing a frame for which the level is equal to or higher than a fifth OSI layer. When session data for an RTP frame, which are pertinent to be registered in the temporary registration table 832 or the initial registration table 831, are included in the header data of a frame to be relayed, a bridging event is added to the higher FIFO queue 811 or to the higher FIFO queue 821. When such session data are not registered, the bridging event is added to the lower FIFO queue 812 or to the lower FIFO queue 822.

A plurality of session data sets are preregistered in the initial registration table 831, and each set of session data includes: an MAC address for a location, which is pertinent to an OSI second layer; a protocol number and an IP address for the location, which are pertinent to an OSI third layer; a port number (a TCP or UDP port number in this embodiment) for the location, which is pertinent to an OSI fourth layer; and the application packet type, which is equal to or higher than a fifth OSI layer. In this case, the location represents either a transmission source or a transmission destination. Further, each time a new session is established, one set of session data is registered in the temporary registration table 832, and when a session is not established, the session data are deleted. In this case, the session data include: for the headers in a frame, MAC addresses for a transmission destination and a transmission source pertinent to the second OSI layer; the protocol number and the IP address for the transmission destination and the transmission source, which are pertinent to the OSI third layer; and the port numbers (TCP or UDP port numbers in this case) for the transmission destination and the transmission source, which are pertinent to the OSI fourth layer.

The QoS middleware unit 72 includes a header comparator 721, a synthesization unit 722, a header comparator 723, a synthesization unit 724 and an RTP session monitor unit 725.

The header comparator 721 compares the session data in the cache table 83 with the session data extracted from the header data in a frame received from the wireless LAN device driver unit 31, and stores a bridging request (a bridging event) in the FIFO unit 81 having an FIFO queue with a corresponding priority. The synthesization unit 722 synthesizes the output data (a bridging event) of the FIFO unit 81, i.e., identifies the FIFO queue in the FIFO unit 81, and outputs the resultant data to the bridging processor 71. The header comparator 723 compares the session data in the cache table 83 with the session data extracted from the header data of a frame received from the LAN device driver unit 32, and stores a bridging request (a bridging event) in the FIFO unit 82 having an FIFO queue with a corresponding priority. The synthesization unit 724 synthesizes the output data (bridging event) of the FIFO unit 82, i.e., identifies the FIFO queue in the FIFO unit 82, and outputs the resultant data to the bridging processor 71.

The monitor timer unit 84 includes a plurality of timers, and is used to monitor session data that are registered in the temporary registration table 832 of the cache table 83. Each timer in the monitor timer unit 84 is activated (cleared and started) by the RTP session monitor unit 725, and generates a timer interrupt when a predetermined time has been reached.

The RTP session monitor unit 725 activates the timers in the monitor timer unit 84 to monitor the session data registered in the temporary registration table 832 of the cache table 83. When the value held by each timer in the monitor timer unit 84 indicates that a predetermined time (a time out) has been reached, the session data that are being monitored are deleted from the temporary registration table 832.

The operation of the fifth embodiment of the present invention will now be described while referring to FIGS. 3 and 15 to 19.

First, when the LAN interface unit 42 has received, from the wire LAN 902, a frame to be relayed to the wireless LAN 901, the LAN device driver unit 32 permits the LAN interface unit 42 to store the received frame in a location in the relay buffer 85. The LAN device driver unit 32 then issues to the bridging unit 7 a bridging request for the received frame. In this case, the bridging request includes storage location data for the relay buffer 85 and length data for the frame.

Upon receiving the bridging request, the bridging unit 7 shifts the execution control to the header comparator 723. Then, the header comparator 723 extracts, from the header data for the frame stored in the location in the relay buffer 85, the port numbers for a transmission destination and a transmission source, the IP addresses for the transmission destination and the transmission source, the protocol number and the MAC addresses for the transmission destination and the transmission source, and designates these data as session data. The header comparator 723 thereafter determines whether session data having the same contents as the extracted session data are present in the temporary registration table 832 of the cache table 83 (steps S601 and S602 in FIG. 18).

When session data having the same contents as the extracted session data are not found in the temporary registration table 832 (NO at step S602), the header comparator 723 determines examines whether session data having the same contents are present in the initial registration table 831 of the cache table 83 (steps S603 and S604).

When session data having the same contents are found in the initial registration table 831 (YES at step S604), the header comparator 723 examines the RTP header at the OSI fifth layer of a frame to be relayed to determine whether this frame is an RTP frame (steps S605 and S606).

When a frame to be relayed is an RTP frame (YES at step S606), the header comparator 723 registers, in the temporary registration table 832, the session data that are extracted from the header data for the frame, and permits the RTP session monitor unit 13 to activate (reset and start) the timers in the monitor timer unit 84 (steps S607 and S608).

Next, the header comparator 723 adds a bridging request, as a bridging event, to the higher FIFO queue 821 (step S609). In this embodiment, the bridging request includes identification data for a transmission request, the storage location in the relay buffer 85 and the length data for a frame to be relayed.

When a frame to be relayed is not an RTP frame (NO at step S606), the header comparator 723 adds a bridging request, as a bridging event, to the lower FIFO queue 822 (step S611).

When session data having the same contents as the extracted session data are present in the temporary registration table 832 (YES at step S602), the header comparator 723 permits the RTP session monitor unit 725 to reactivate (reset and restart) the timers in the monitor timer unit 84, and adds a bridging request, as a bridging event, to the higher FIFO queue 821 (steps 610 and S609).

When session data having the same contents are not found in the initial registration table 831 (NO at step S604), the header comparator 723 adds a bridging request, as a bridging event, to the lower FIFO queue 822 (step S611).

Figure 19:
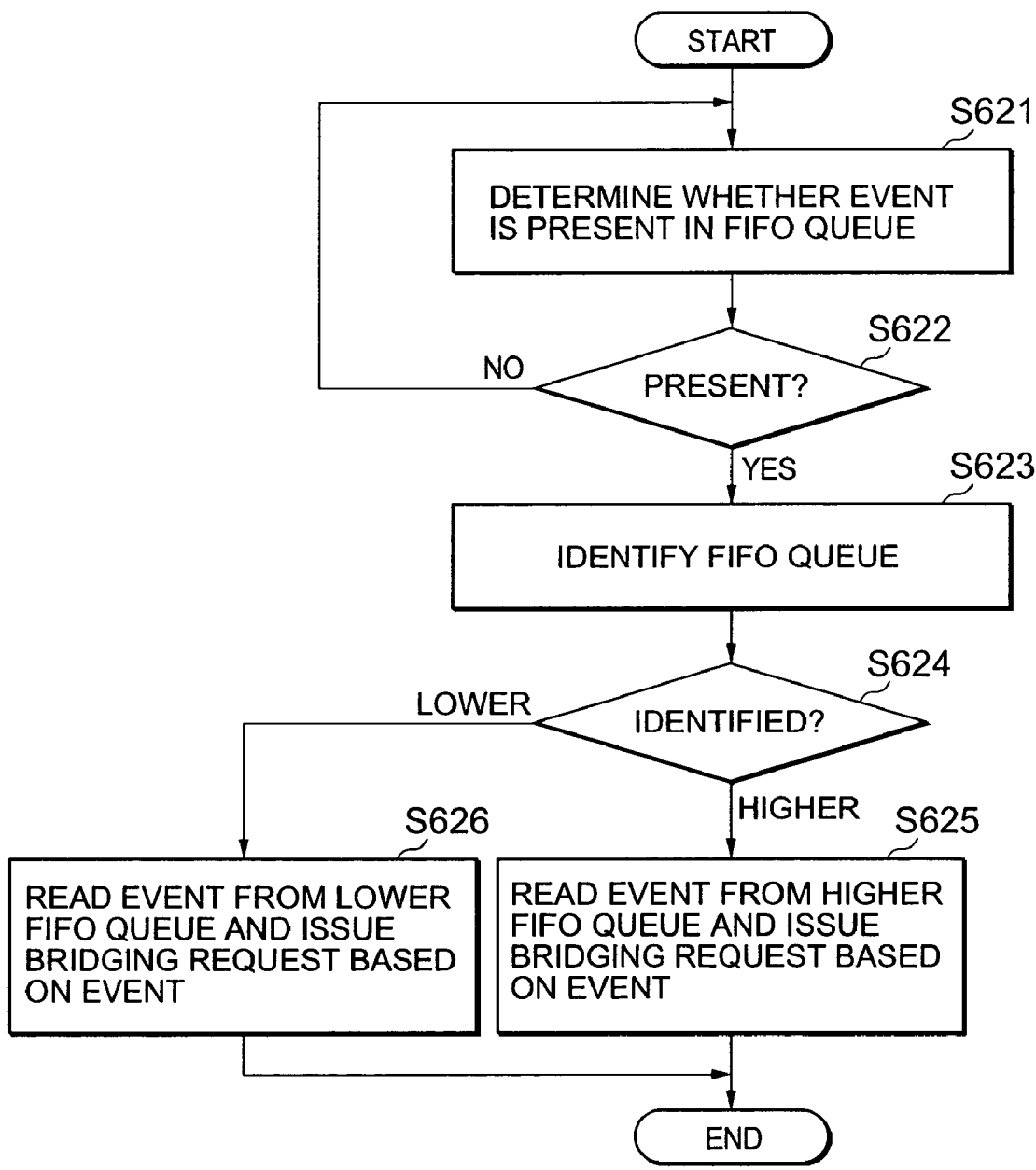
FIG. 19 is a flowchart showing the operation of the synthesization unit of the QoS middleware unit in FIG. 15.

When the bridging processor 71 is not currently engaged in transmission (is not in use), the synthesization unit 724 determines whether the bridging event is present in the FIFO unit 82 (steps S621 and S622 in FIG. 19). When the bridging event has been stored in the FIFO unit 82 (YES at step S622), the synthesization unit 724 identifies the FIFO queue in the FIFO unit 82 (steps S623 and S624).

When the bridging event is present in the higher FIFO queue 821 (higher at step S624), based on the bridging event that is read from the higher FIFO queue 821 (step S625), the synthesization unit 724 issues a bridging request to the bridging processor 71. When the bridging event is not present in the higher FIFO queue 821 (lower at step S624), based on the bridging event that is read from the lower FIFO queue 822 (step S626), the synthesization unit 724 issues a bridging request to the bridging processor 71.

When the bridging processor 71 has received the bridging request and when the MAC address of the transmission destination, which is the address of the frame that has been received and stored in the relay buffer 85, has not yet been registered in the address table, because this frame must be relayed, the bridging processor 71 issues a transmission request to the wireless LAN device driver unit 31. Whereas when the MAC address of the transmission destination has already been registered in the address table, the bridging processor 71 need not relay the frame, and ignores it by releasing the pertinent location in the relay buffer 85.

Based on the transmission request received from the bridging processor 71 of the bridging unit 7, the wireless LAN device driver unit 31 permits the wireless LAN interface unit 41 to transmit the frame from the pertinent location in the relay buffer 85 to the wireless LAN 901.

When the wireless LAN interface unit 41 receives, from the wireless LAN 901, the frame to be relayed to the wire LAN 902, the wireless LAN device driver unit 31 permits the wireless LAN interface unit 41 to store the received frame in the relay buffer 85, and thereafter, issues to the bridging unit 7 a bridging request for the received frame.

Upon receiving the bridging request from the wireless LAN device driver unit 31, the bridging unit 7 shifts the execution control to the QoS middleware unit 72. The header comparator 721 of the QoS middleware unit 72 extracts, from the header data for the frame, the port numbers for the transmission destination and the transmission source, the IP addresses for the transmission destination and the transmission source, the protocol number and the MAC addresses for the transmission destination and the transmission source, and designates these data as session data. The header comparator 721 then determines whether session data having the same contents as the extracted session data are present in the temporary registration table 832 of the cache table 83 (steps S501 and S502 in FIG. 16).

When session data having the same contents are not found in the temporary registration table 832 (NO at step S502), the header comparator 721 determines whether session data having the same contents as the extracted session data are present in the initial registration table 831 of the cache table 83 (steps S503 and S504).

When session data having the same contents are found in the initial registration table 831 (YES at step S504), the header comparator 721 examines the RTP header at the OSI fifth layer of the frame to be relayed to determine whether this frame is an RTP frame (steps S505 and S506).

When the frame to be relayed is an RTP frame (YES at step S506), the header comparator 721 registers, in the temporary registration table 832, the session data that are extracted from the header data for the frame, and permits the RTP session monitor unit 725 to activate the timers in the monitor timer unit 84 (steps S507 and S508).

Further, the header comparator 721 adds a bridging request, as a bridging event, to the higher FIFO queue 811 (step S509). In this case, the bridging request includes the identification data for a transmission request, the storage location in the relay buffer 85 and the length data for a frame to be relayed.

When the frame to be relayed is not an RTP frame (NO at step S506), the header comparator 721 adds a bridging request, as a bridging event, to the lower FIFO queue 812 (step S511).

When session data having the same contents as the extracted session data are found in the temporary registration table 832 (YES at step S502), the header comparator 721 permits the RTP session monitor unit 725 to reactivate the timers in the monitor timer unit 84, and adds a bridging request, as a bridging event, to the higher FIFO queue 811 (steps S510 and S509).

When session data having the same contents are not found in the initial registration table 831 (NO at step S504), the header comparator 721 adds a bridging request, as a bridging event, to the lower FIFO queue 812 (step S511).

Figure 17:
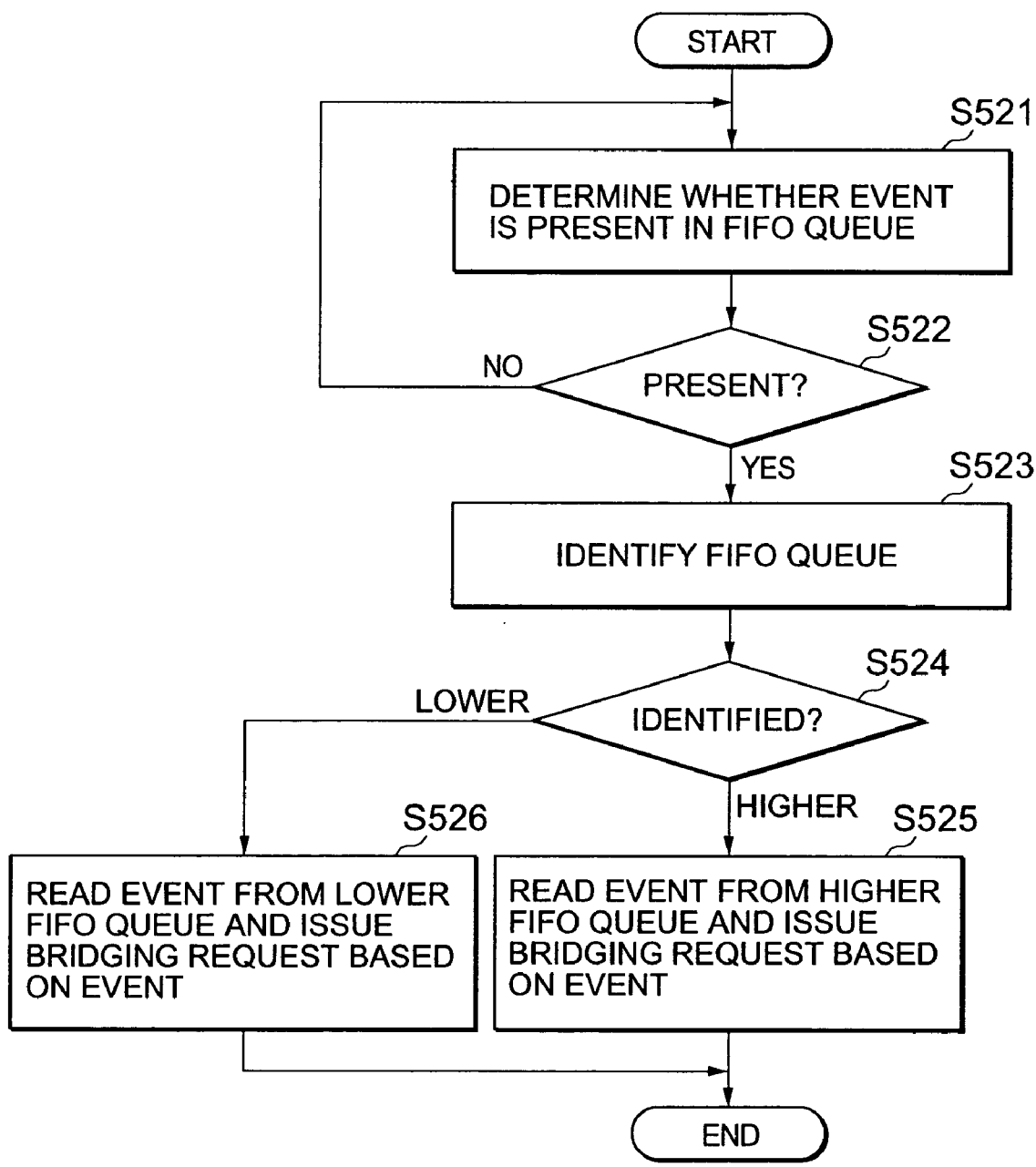
FIG. 17 is a flowchart showing the operation of the synthesization unit of the QoS middleware unit in FIG. 15.
Figure 18:
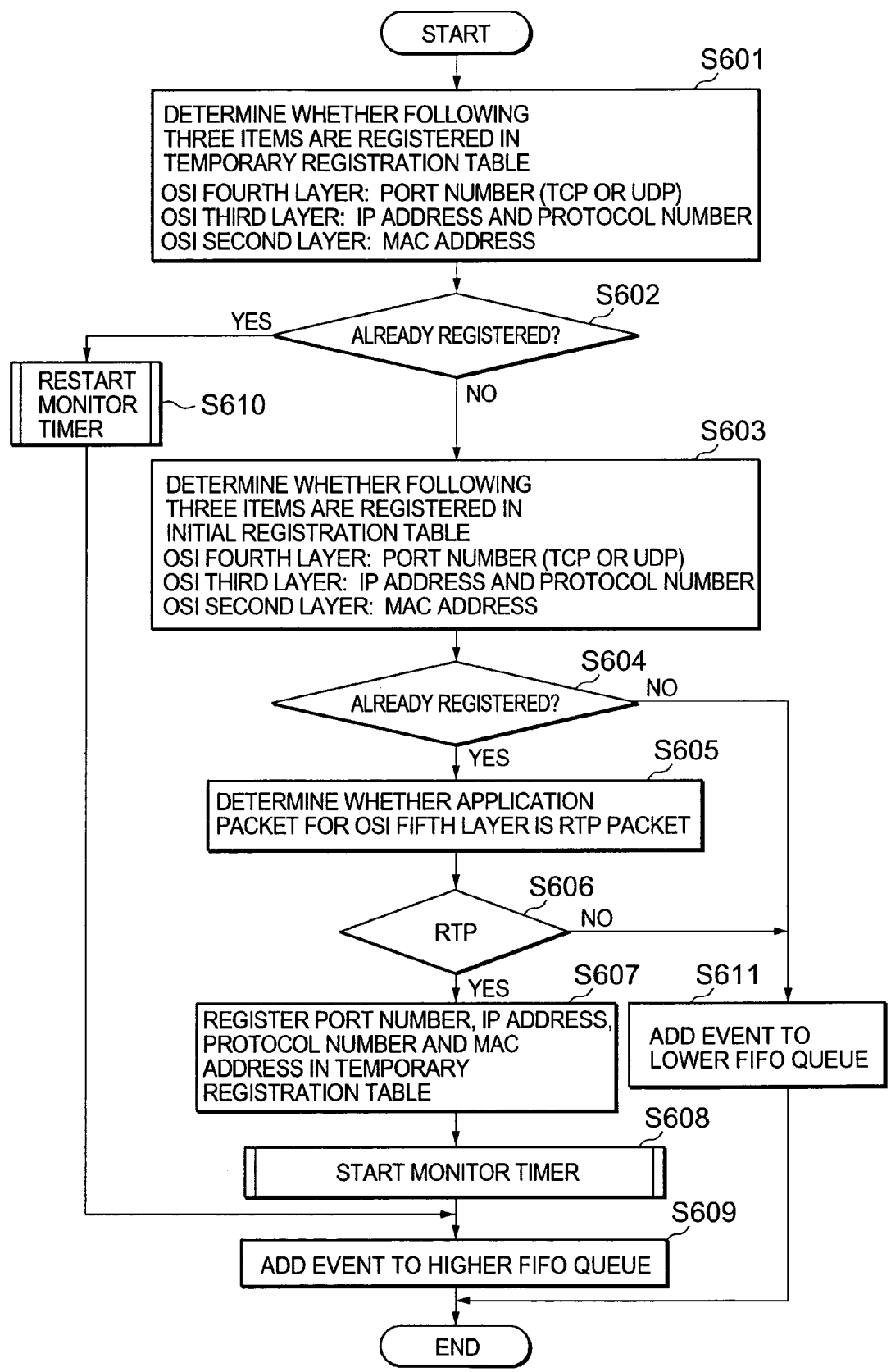
FIG. 18 is a flowchart showing the operation of the header comparator of the QoS middleware unit in FIG. 15.

When the bridging processor 71 is not currently engaged in transmission (is not in use), the synthesization unit 722 determines whether the bridging event is present in the FIFO unit 81 (steps S521 and S522 in FIG. 17). When the bridging event is stored in the FIFO unit 81 (YES at step S522), the synthesization unit 722 identifies an FIFO queue in the FIFO unit 81 (steps S523 and S524).

When the bridging event is present in the higher FIFO queue 811 (higher at step S524), based on the bridging event that is read from the higher FIFO queue 811, the synthesization unit 722 issues a bridging request to the bridging processor 71 (step S525). When the bridging event is not present in the higher FIFO queue 811 (the lower at step S524), based on the bridging event that is read from the lower FIFO queue 812 (step S526), the synthesization unit 722 issues a bridging request to the bridging processor 71.

When the bridging processor 71 of the bridging unit 7 has received the bridging request from the synthesization unit 722, and when the MAC address of the transmission destination, which is the address for the packet of the received frame, is not registered in the address table, because the frame must be relayed, the bridging processor 71 issues a transmission request to the LAN device driver unit 32. When the MAC address of the transmission destination is registered in the address table, the bridging processor 71 need not relay the received frame, and it ignores the frame by releasing the pertinent location in the relay buffer 85.

Upon receiving the transmission request from the bridging processor 71 of the bridging unit 7, the LAN device driver unit 32 permits the LAN interface unit 42 to transmit a frame from the pertinent location in the relay buffer 85 to the wire LAN 902.

The RTP packet has been employed in the explanations for the first to the fifth embodiments; however, another specific packet having a communication protocol equal to or higher than the OSI fifth layer may also be employed.

Furthermore, in the first to the fifth embodiments, the memory capacity of the virtual FIFO unit may be dynamically changed in accordance with the cache table data or the usage efficiency of the FIFO unit. A data-read-ahead process for the FIFO unit may be performed faster than the physical line speed by using a predetermined algorithm, or may be performed on appearance. For example, the data-read-ahead process may be performed at a speed 10% higher to prevent the reading of data at a speed excessively higher than the physical line speed. When data overflows from the FIFO unit, the physical line speed may be reduced by 10% to prevent too great a speed reduction relative to the physical line speed, or to prevent a communication block.

While the present invention has been described in connection with certain preferred embodiments, it is to be understood that the subject matter encompassed by the present invention is not limited to those specific embodiments. On the contrary, it is intended to include, within the spirit and scope of the following claims, all possible alternatives, modifications and equivalents.

What is claimed is:

1. A bridge apparatus comprising:
    a first device driver unit for controlling a first interface unit connected to a first network;
    a second device driver unit for controlling a second interface unit connected to a second network;
    a bridging unit for performing a bridging process;
    a middleware unit, inserted between the bridging unit and the first device driver unit, that includes
        a transmitter for performing priority processing for a relay of a frame from the bridging unit to the first device driver unit;
        a cache table in which session data having high priorities are preregistered; and
        a plurality of first FIFO queues corresponding to priorities,
    wherein the transmitter includes
        a header comparator for, upon the reception of a transmission request for the frame to be relayed from the bridging unit to the first device driver unit, searching the cache table and extracting a priority based on headers included in a second to a fourth OSI layer of the frame, and for adding the transmission request to one of the first FIFO queues in accordance with the priority that is extracted, and
        a synthesization unit for, in accordance with a priority for the first FIFO queue, outputting the transmission request from the first FIFO queue to the first device driver unit.

2. A bridge apparatus comprising:
    a first device driver unit for controlling a first interface unit connected to a first network;
    a second device driver unit for controlling a second interface unit connected to a second network;
    a bridging unit for performing a bridging process;
    a middleware unit, inserted between the bridging unit and the first device driver unit, that includes
        a transmitter for performing priority processing for a relay of a frame from the bridging unit to the first device driver unit;
    a first cache table, in which first session data are predesignated;
    a second cache table, used when a session is established;
    a first FIFO queue; and
    a second FIFO queue,
    wherein the middleware unit includes
        a first header comparator for, when a transmission request is issued for the frame to be relayed from the bridging unit to the first device, extracting second session data from headers of a second to a fourth OSI layer in the frame and, when the second session data are registered in the second cache table, adding the transmission request to the first FIFO queue; for, when the second session data are registered neither in the first cache table nor in the second cache table and the frame to be relayed is a specific, predesignated frame, registering the second session data in the second cache table and adding the transmission request to the first FIFO queue; for, when the second session data are registered in the first cache table but not in the second cache table and the frame is not a specific, predesignated frame, adding the transmission request to the second FIFO buffer; or for, when the second session data are registered neither in the first nor the second cache tables, adding the transmission request to the second FIFO queue, and
        a synthesization unit for outputting to the first device driver unit, in the named order, the transmission requests in the first FIFO queue and in the second FIFO queue.

3. A bridge apparatus according to claim 2, wherein the middleware unit includes:
    the header comparator for activating a frame monitor timer when the second session data are not registered in the second cache table but are registered in the first cache table, and when the frame to be relayed is a specific predesignated frame; and
    a monitor unit for, when the value of the frame monitor timer has reached a predetermined value, deleting from the second cache table the second session data that correspond to the frame monitor timer.

4. A bridge apparatus comprising:
first device driver unit for controlling a first interface unit connected to a first network;
a second device driver unit for controlling a second interface unit connected to a second network;
a bridging unit for determining whether the address of a frame received from the first or the second network is registered in an address table, and for performing bridging processing for the frame;
a middleware unit including
  a transmitter, inserted between the bridging unit and the first device driver unit, for performing the priority processing for a first frame to be relayed from the bridging unit to the first device driver unit, and
  a receiver, inserted between the bridging unit and the second device driver unit, for performing the priority processing for a second frame to be relayed from the first device driver unit to the bridging unit;
a cache table in which session data are preregistered;
a first FIFO queue for the transmitter; and
a second FIFO queue for the receiver,
wherein the transmitter includes
  a first header comparator for, upon the reception of a transmission request for the first frame to be relayed from the bridging unit to the first device driver unit, searching the cache table and extracting a first priority, based on headers that are included in a second to a fourth OSI layer in the first frame, and for, in accordance with the first priority, adding the transmission request for the first frame to the first FIFO queue, and
  a first synthesization unit for transmitting, in accordance with the first priority, the transmission request from the first FIFO queue to the first device driver unit,
and wherein the receiver includes
  a second header comparator for, upon the reception of a bridging request for the second frame, searching the cache table and extracting a second priority, based on headers that are included in a second to a fourth OSI layer in the second frame, and, for, in accordance with the second priority, adding the bridging request for the second frame to the second FIFO queue, and
  a second synthesization unit for transmitting, in accordance with the second priority, the bridging request from the second FIFO queue to the bridging unit.

5. A bridge apparatus comprising:
a first device driver unit for controlling a first interface unit connected to a first network;
a second device driver unit for controlling a second interface unit connected to a second network;
a bridging unit for examining the address of a frame received from the first or the second network to determine whether the address is registered in an address table, and for performing bridging processing for the frame;
a middleware unit, inserted between the bridging unit and the first device driver unit;
a first cache table, in which first session data having a high priority are predesignated;
a second cache table, used when a session is established;
a first FIFO queue;
a second FIFO queue;
a third FIFO queue; and
a fourth FIFO queue,
wherein the middleware unit includes
  a first header comparator for, when a transmission request is issued for a first frame to relayed from the bridging unit to the first device driver unit, extracting second session data from headers of a second to a fourth OSI layer in the first frame and, when the second session data are registered in the second cache table, adding the transmission request to the first FIFO queue; for, when the second session data are registered in the first cache table but not in the second cache table and the first frame to be relayed is a specific, predesignated frame, registering the second session data in the second cache table and adding the transmission request to the first FIFO queue; for, when the second session data are registered in the first cache table but not in the second cache table and the first frame is not a specific, predesignated frame, adding the transmission request to the second FIFO buffer; or for, when the second session data are registered neither in the first nor the second cache tables, adding the transmission request to the second FIFO queue,
  a first synthesization unit for outputting to the first device driver unit, in the named order, the transmission requests in the first FIFO queue and in the second FIFO queue,
  a second header comparator for, when a bridging request is issued for a second frame to be relayed from the first device driver unit to the bridging unit, extracting third session data from headers of a second to a fourth OSI layer in the second frame and, when the third session data are registered in the second cache table, adding the bridging request to the third FIFO queue; for, when the third session data are registered in the first cache table but not in the second cache table and the second frame to be relayed is a specific, predesignated frame, registering the third session data in the second cache table and adding the bridging request to the third FIFO queue; for, when the third session data are registered in the first cache table but not in the second cache table and the second frame is not a specific, predesignated frame, adding the bridging request to the fourth FIFO queue; or for, when the second session data are registered neither in the first nor in the second cache tables, adding the bridging request to the fourth FIFO queue, and
  a second synthesization unit for outputting to the bridging unit, in the named order, the bridging requests in the third FIFO queue and in the fourth FIFO queue.

6. A bridge apparatus according to claim 5, wherein the middleware unit includes:
  the first header comparator for activating a first frame monitor timer when the second session data are not registered in the second cache table but are registered in the first cache table, and when the first frame to be relayed is a specific predesignated frame;
  the second header comparator for activating a second frame monitor timer when the third session data are not registered in the second cache table but are registered in the first cache table, and when the second frame to be relayed is a specific predesignated frame; and
  a monitor unit for, when the value of the first frame monitor timer has reached a predetermined value, deleting from the second cache table the second session data that correspond to the first frame monitor timer, and for, when the value of the second frame monitor timer has reached a predetermined value, deleting from the second cache table the third session data that correspond to the second frame monitor timer.

7. A bridge apparatus comprising:
a first device driver unit for controlling a first interface unit connected to a first network;
a second device driver unit for controlling a second interface unit connected to a second network;
a bridging unit for determining whether the address of a frame received from the first or the second network is registered in an address table, and for performing bridging processing for the frame;
a first middleware unit including
a first transmitter, inserted between the bridging unit and the first device driver unit, for performing the priority processing for a first frame to be relayed from the bridging unit to the first device driver unit, and
a first receiver, inserted between the bridging unit and the first device driver unit, for performing the priority processing for a second frame to be relayed from the first device driver unit to the bridging unit; and
a second middleware unit including
a second transmitter, inserted between the bridging unit and the second device driver unit, for performing the priority processing for a third frame to be relayed from the bridging unit to the second device driver unit, and
a second receiver, inserted between the bridging unit and the second device driver unit, for performing the priority processing for a third frame to be relayed from the second device driver unit to the bridging unit.

8. A bridge apparatus according to claim 7, further comprising:
a cache table in which session data having a high priority are preregistered;
a transmission FIFO queue, used for the second transmitter and corresponding to a priority; and
a reception FIFO queue, used for the second receiver and corresponding to a priority,
wherein the second transmitter includes
a transmission request header comparator for, upon the reception of a transmission request for the third frame to be relayed from the bridging unit to the second device driver unit, searching the cache table and, based on headers that are included in a second to a fourth OSI layer in the third frame, extracting a transmission priority and, in accordance with the transmission priority, adding the transmission request for the third frame to the transmission FIFO queue, and
a transmission request synthesization unit for transmitting, in accordance with the transmission priority, the transmission request from the transmission FIFO queue to the second device driver unit,
and wherein the second receiver includes
a bridging request header comparator for, upon the reception of a bridging request for the fourth frame to be relayed from the second device driver unit to the bridging unit, searching the cache table and, based on headers that are included in a second to a fourth OSI layer in the fourth frame, extracting a reception priority and, in accordance with the reception priority, adding the bridging request for the fourth frame to the reception FIFO queue, and a bridging request synthesization unit for, in accordance with the reception priority, transmitting the bridging request from the reception FIFO queue to the bridging unit.

9. A bridge apparatus comprising:
a first device driver unit for controlling a first interface unit connected to a first network;
a second device driver unit for controlling a second interface unit connected to a second network;
a bridging unit for performing bridging processing;
a middleware unit, inserted between the bridging unit and the first and second device driver units;
a first cache table, in which first session data are predesignated;
a second cache table, used when a session is established;
a third cache table, in which fourth session data are predesignated;
a fourth cache table, used when a session is established;
a first FIFO queue;
a second FIFO queue;
a third FIFO queue;
a fourth FIFO queue;
a fifth FIFO queue;
a sixth FIFO queue;
a seventh FIFO queue; and
an eighth FIFO queue,
wherein the middleware unit includes
a first header comparator for, when a transmission request is issued for a first frame to relayed from the bridging unit to the first device driver unit, extracting second session data from headers of a second to a fourth OSI layer in the first frame and, when the second session data are registered in the second cache table, adding the transmission request for the first frame to the first FIFO queue; for, when the second session data are registered in the first cache table but not in the second cache table and the first frame to be relayed is a specific, predesignated frame, registering the second session data in the second cache table and adding the transmission request to the first FIFO queue; for, when the second session data are registered in the first cache table but not in the second cache table and the first frame is not a specific, predesignated frame, adding the transmission request to the second FIFO buffer; or for, when the second session data are registered neither in the first nor the second cache tables, adding the transmission request to the second FIFO queue,
a first synthesization unit for outputting to the first device driver unit, in the named order, the transmission requests for the first frame in the first FIFO queue and in the second FIFO queue,
a second header comparator for, when a bridging request is issued for a second frame to be relayed from the first device driver unit to the bridging unit, extracting third session data from headers of a second to a fourth OSI layer in the second frame and, when the third session data are registered in the second cache table, adding the bridging request for the second frame to the third FIFO queue; for, when the third session data are registered in the first cache table but not in the second cache table and the second frame to be relayed is a specific, predesignated frame, registering the third session data in the second cache table and adding the bridging request to the third FIFO queue; for, when the third session data are registered in the first cache table but not in the second cache table and the second frame is not a specific, predesignated frame, adding the bridging request to the fourth FIFO queue; or for, when the second session data are registered neither in the first nor in the second cache tables, adding the bridging request to the fourth FIFO queue, a second synthesization unit for outputting to the bridging unit, in the named order, the bridging requests for the second frame in the third FIFO queue and in the fourth FIFO queue, a third header comparator for, when a transmission request is issued for a third frame to relayed from the bridging unit to the second device driver unit, extracting fifth session data from headers of a second to a fourth OSI layer in the third frame and, when the fifth session data are registered in the fourth cache table, adding the transmission request for the third frame to the fifth FIFO queue; for, when the fifth session data are registered in the third cache table but not in the fourth cache table and the third frame to be relayed is a specific, predesignated frame, registering the fifth session data in the fourth cache table and adding the transmission request to the fifth FIFO queue; for, when the fifth session data are registered in the third cache table but not in the fourth cache table and the third frame is not a specific, predesignated frame, adding the transmission request to the sixth FIFO buffer; or for, when the fifth session data are registered neither in the third nor the fourth cache tables, adding the transmission request to the sixth FIFO queue, a third synthesization unit for outputting to the second device driver unit, in the named order, the transmission requests for the third frame in the fifth FIFO queue and in the sixth FIFO queue, a fourth header comparator for, when a bridging request is issued for a fourth frame to be relayed from the second device driver unit to the bridging unit, extracting sixth session data from headers of a second to a fourth OSI layer in the fourth frame and, when the sixth session data are registered in the fourth cache table, adding the bridging request for the fourth frame to the seventh FIFO queue; for, when the sixth session data are registered in the third cache table but not in the fourth cache table and the fourth frame to be relayed is a specific, predesignated frame, registering the sixth session data in the fourth cache table and adding the bridging request to the seventh FIFO queue; for, when the sixth session data are registered in the third cache table but not in the fourth cache table and the fourth frame is not a specific, predesignated frame, adding the bridging request to the eighth FIFO queue; or for, when the sixth session data are registered neither in the third nor in the fourth cache tables, adding the bridging request to the eighth FIFO queue, and a fourth synthesization unit for outputting to the bridging unit, in the named order, the bridging requests for the fourth frame in the seventh FIFO queue and in the eighth FIFO queue.

10. A bridge apparatus according to claim 9, further comprising:
a first monitor timer;
a second monitor timer;
a third monitor timer; and
a fourth monitor timer,
wherein the middleware unit includes a monitor unit for deleting the second session data from the second cache table when a specific value is reached in the first monitor timer, for deleting the third session data from the second cache table when a specific value is reached in the second monitor timer, for deleting the fourth session data from the fourth cache table when a specific value is reached in the third monitor timer, and for deleting the fifth session data from the fourth cache table when a specific value is reached in a fourth monitor timer.

11. A bridge apparatus comprising:
a first device driver unit for controlling a first interface unit connected to a first network;
a second device driver unit for controlling a second interface unit connected to a second network;
a bridging unit for performing bridging processing;
a cache table in which session data having a high priority are stored;
a first FIFO queue corresponding to a priority;
a second FIFO queue corresponding to a priority,
wherein the bridging unit includes
a bridging processor connected to the first device driver unit and the second device driver unit,
a first header comparator for, when a first bridging request for a first frame to be relayed is received from the first device driver unit, searching the cache table and extracting a first priority for the first bridging request, based on headers that are included in a second to a fourth OSI layer in the first frame, and for, in accordance with the first priority, adding the first bridging request to the first FIFO queue,
a first synthesization unit for transmitting, in accordance with the first priority, the first bridging request from the first FIFO queue to the bridging processor,
a second header comparator for, when a second bridging request for a second frame to be relayed is received from the second device driver unit, searching the cache table and extracting a second priority for the second bridging request, based on headers that are included in a second to a fourth OSI layer in the second frame, and for, in accordance with the second priority, adding the second bridging request to the second FIFO queue, and
a second synthesization unit for transmitting, in accordance with the second priority, the second bridging request from the second FIFO queue to the bridging processor.

12. A bridge apparatus comprising:
a first device driver unit for controlling a first interface unit connected to a first network;
a second device driver unit for controlling a second interface unit connected to a second network;
a bridging processor for performing bridging processing;
a first cache table, in which first session data having a high priority are predesignated;
a second cache table, used when a session is established;
a first FIFO queue;
a second FIFO queue;
a third FIFO queue; and
a fourth FIFO queue,
wherein the middleware unit includes
a first header comparator for, when a bridging request is issued for a first frame to relayed from the first device driver unit to the bridging processor, extracting second session data from headers of a second to a fourth OSI layer in the first frame and, when the second session data are registered in the second cache table, adding the bridging request for the first frame to the first FIFO queue; for, when the second session data are registered in the first cache table but not in the second cache table and the first frame to be relayed is a specific, predesignated frame, registering the second session data in the second cache table and adding the bridging request to the first FIFO queue; for, when the second session data are registered in the first cache table but not in the second cache table and the first frame is not a specific, predesignated frame, adding the bridging request to the second FIFO buffer; or for, when the second session data are registered neither in the first nor the second cache tables, adding the bridging request to the second FIFO queue, a first synthesization unit for outputting to the bridging processor, in the named order, the bridging requests for the first frame in the first FIFO queue and in the second FIFO queue, a second header comparator for, when a bridging request is issued for a second frame to be relayed from the second device driver unit to the bridging processor, extracting third session data from headers of a second to a fourth OSI layer in the second frame and, when the third session data are registered in the second cache table, adding the bridging request for the second frame to the third FIFO queue; for, when the third session data are registered in the first cache table but not in the second cache table and the second frame to be relayed is a specific, predesignated frame, registering the third session data in the second cache table and adding the bridging request to the third FIFO queue; for, when the third session data are registered in the first cache table but not in the second cache table and the second frame is not a specific, predesignated frame, adding the bridging request to the fourth FIFO queue; or for, when the second session data are registered neither in the first nor in the second cache tables, adding the bridging request to the fourth FIFO queue, and a second synthesization unit for outputting to the bridging processor, in the named order, the bridging requests for the second frame in the third FIFO queue and in the fourth FIFO queue.

13. A bridge apparatus according to claim 12, further comprising:
a first monitor timer;
a second monitor timer; and
a monitor unit for deleting the second session data from the second cache table when a specific value is reached in the first monitor timer, for deleting the third session data from the second cache table when a specific value is reached in the second monitor timer, for deleting the fourth session data from the fourth cache table when a specific value is reached in the third monitor timer, and for deleting the fifth session data from the fourth cache table when a specific value is reached in a fourth monitor timer.

14. A bridge apparatus according to claim 2, wherein the specific frame is a frame, including an RTP frame, defined by a communication protocol equal to or higher than a fifth OSI layer.

15. A bridge apparatus according to claim 1, wherein the session data include an MAC address that is pertinent to the second OSI layer of the frame, a protocol number and an IP address that are pertinent to the third OSI layer, and a port number that is pertinent to the fourth OSI layer.

16. A bridge apparatus according to claim 2, wherein the first session data include an MAC address that is pertinent to the second OSI layer of the frame, a protocol number and an IP address that are pertinent to the third OSI layer, and a port number that is pertinent to the fourth OSI layer.

17. A bridge apparatus according to claim 5, wherein the second and third session data include an MAC address that is pertinent to the second OSI layer of the frame, a protocol number and an IP address that are pertinent to the third OSI layer, and a port number that is pertinent to the fourth OSI layer.

18. A bridge apparatus according to claim 9, wherein the fourth session data include an MAC address that is pertinent to the second OSI layer of the frame, a protocol number and an IP address that are pertinent to the third OSI layer, and a port number that is pertinent to the fourth OSI layer.

19. A bridge apparatus according to claim 9, wherein the fifth and sixth session data include an MAC address that is pertinent to the second OSI layer of the frame, a protocol number and an IP address that are pertinent to the third OSI layer, and a port number that is pertinent to the fourth OSI layer.

20. A bridge method, for a bridge apparatus that relays a second network and a first network, comprising steps of:
receiving a specific frame to be relayed from the second network to the first network and extracting session data from headers of a second to a fourth OSI layer in the specific frame;
when the session data satisfy a predetermined condition, increasing a bridging priority for the specific frame and performing bridging processing;
thereafter, when the session data extracted from the specific frame satisfy a predetermined condition, increasing a transmission priority for the specific frame and transmitting the specific frame to the first network;
receiving a specific frame to be relayed from the first network to the second network, and extracting session data from headers of a second to a fourth OSI layer in the specific frame;
when the session data satisfy a predetermined condition, increasing a bridging priority for the specific frame and performing bridging processing;
thereafter, extracting session data from the headers of the second to the fourth OSI layer in the specific frame; and
when the session data extracted from the specific frame satisfy a predetermined condition, increasing a transmission priority for the specific frame and transmitting the specific frame to the second network.

21. A bridge method for a bridge apparatus that relays frames for a second network and a first network comprising the steps of:
receiving from the second network a specific frame to be relayed to the first network;
when session data extracted from headers of a second to a fourth OSI layer in the specific frame satisfy a predetermined condition, providing a higher priority for the specific frame in a bridging queue, performing bridging processing and transmitting the specific frame to the first network;
receiving from the first network a specific frame addressing a transmission destination connected to the second network;
when session data extracted from headers of a second to a fourth OSI layer in the specific frame satisfy a predetermined condition, providing a higher priority for the specific frame in a bridging queue, performing bridging processing, and transmitting the specific frame to the second network.

22. A bridge method, for a bridge apparatus that comprises a device driver for controlling interface units connected to a plurality of networks, a bridging unit, for comparing the address of a frame received via each of the networks with each MAC address registered in an address table and for performing bridging processing for the frame, and a middleware unit, for controlling the interface unit between the bridging unit and the device driver, comprising steps of:

when the bridging unit issues transmission requests for relaying specific sequential frames to a predetermined transmission destination, upon the reception of a first transmission request, the middleware unit, for confirming header data included in a first specific frame, extracting session data from headers of a second to a fourth OSI layer of the first specific frame, registering the session data in a cache table, increasing a transmission priority for the first specific frame, and issuing a transmission request to the device driver; and when the succeeding specific frames are to be sequentially transmitted, the middleware unit comparing the session data registered in the cache table with session data extracted from the second to the fourth OSI layers of the succeeding specific frames, transmission priorities being increased for specific succeeding frames, and transmission requests being output to the device driver.

23. A bridge method, according to claim 22, further comprising steps of:

when the device driver issues bridging requests for specific sequential frames, which are output by a predetermined transmission source and which are defined by a communication protocol as being equal to or higher than a fifth OSI layer, upon the reception of a first bridging request, the middleware unit confirming header data in a first specific frame, extracting session data from headers for a second to a fourth OSI layer in the first specific frame, registering the session data in a cache table, increasing a bridging priority for the first specific frame and issuing a bridging request to the bridging unit; and, when succeeding specific frames are to be sequentially received, the middleware unit comparing the session data registered in the cache table with session data extracted from second to fourth OSI layers in the succeeding specific frames, increasing bridging priorities for the succeeding specific frames, and outputting bridging requests to the bridging unit.

24. A bridge method, according to claim 22, wherefor, when session data are registered in the cache table, monitoring of the session data is continuously performed by the middleware unit until a predetermined period of time has elapsed and no transmission request has been received from the bridging unit for a frame having the session data.

25. A bridge method, according to claim 23, wherefor the middleware unit includes a monitor timer; and wherefor, when a value held by the monitor timer reaches a predetermined value, session data are deleted from the cache table by the middleware unit.

26. A bridge method for a bridge apparatus that relays frames for a second network and a first network comprising the steps of:

receiving from the second network a specific frame to be relayed to the first network;

when session data extracted session data from headers of a second to a fourth OSI layer of the specific frame satisfy a predetermined condition, providing a higher priority for the specific frame in a transmission queue and transmitting the specific frame to the first network; and receiving the specific frame that is to be relayed by the second network to the first network and that is defined by a communication protocol equal to or higher than the fifth OSI layer and that includes an RTP frame.

27. A bridge method for a bridge apparatus that relays frames for a second network and a first network comprising the steps of:

receiving from the second network a specific frame to be relayed to the first network;

when session data extracted session data from headers of a second to a fourth OSI layer of the specific frame satisfy a predetermined condition, providing a higher priority for the specific frame in a transmission queue and transmitting the specific frame to the first network; and extracting the session data, which include an MAC address pertinent to the second OSI layer for the specific frame, a protocol number and an IP address pertinent to the third OSI layer, and a port number pertinent to the fourth OSI layer.

* * * * *